(12) United States Patent
Kim et al.

(10) Patent No.: US 8,036,177 B2
(45) Date of Patent: Oct. 11, 2011

(54) METHOD OF SUPPORTING HANDOVER IN A MULTI-MODE MOBILE STATION

(75) Inventors: Yong-Ho Kim, Bucheon (KR); Jin Lee, Seoul (KR); Yong-Won Kwak, Anyang (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/614,360

(22) Filed: Nov. 6, 2009

(65) Prior Publication Data

US 2010/0048213 A1     Feb. 25, 2010

Related U.S. Application Data

(63) Continuation of application No. 11/416,890, filed on May 2, 2006, now Pat. No. 7,649,867.

(30) Foreign Application Priority Data

May 2, 2005 (KR) .......................... 10-2005-0036664
May 16, 2005 (KR) .......................... 10-2005-0040497

(51) Int. Cl.
*H04W 4/00*     (2009.01)
(52) U.S. Cl. ..................... 370/331; 455/436; 455/435.1; 455/432.1
(58) Field of Classification Search .................. 455/436, 455/435.1, 432.1; 370/331
See application file for complete search history.

(56) References Cited

U.S. PATENT DOCUMENTS

| | | | |
|---|---|---|---|
| 6,519,233 B1 * | 2/2003 | Gutierrez | ...................... 370/320 |
| 6,690,938 B1 | 2/2004 | Chin | |
| 6,799,204 B1 * | 9/2004 | Baba et al. | ..................... 709/220 |

(Continued)

FOREIGN PATENT DOCUMENTS

WO     2004045081     5/2004

OTHER PUBLICATIONS

IETF Seamoby Working Group: "Candidate Access Router Discovery", Draft-IETF-Seamoby-Card-Protocol-08.TXT, XP015027181, Sep. 2004, Retrieved from the Internet: <URL:http:/tools.ietf.org/html/draft-ietf-seamoby-card-protocol-08.txt.

(Continued)

*Primary Examiner* — Patrick Edouard
*Assistant Examiner* — Aung Win
(74) *Attorney, Agent, or Firm* — Lee, Hong, Degerman, Kang & Waimey

(57) ABSTRACT

A method of discovering at least one of a homogeneous and a heterogeneous network module to perform handover with in a wireless mobile communication network is disclosed. More specifically, the method includes establishing a network handover module for converging information from at least one network interface module associated with at least one of a homogeneous and a heterogeneous network handover module into a unified presentation and transmitting a broadcast request message from a mobile station (MS) to a source point of attachment (PoA) which transmits the broadcast request message to at least one interface module to identify whether the at least one interface module supports at least one of the homogeneous and the heterogeneous network handover module and a capability of the at least one of the homogeneous and the heterogeneous network handover module. The method further includes initiating a timer for a specified time period when the broadcast request message is transmitted and receiving at least one response message from the at least one interface module via the source PoA prior to expiration of the timer, wherein the response message indicates that the at least one interface module supports at least one of the homogeneous and the heterogeneous network handover module and the capability of the at least one of the homogeneous and the heterogeneous network handover module.

6 Claims, 19 Drawing Sheets

U.S. PATENT DOCUMENTS

| | | | |
|---|---|---|---|
| 7,496,364 B2 * | 2/2009 | Hoghooghi et al. | 455/436 |
| 2004/0153570 A1 | 8/2004 | Shobatake | |
| 2006/0251020 A1 * | 11/2006 | Olvera-Hernandez et al. | 370/331 |

OTHER PUBLICATIONS

Hoghooghi, et al.: "Optimal Beacon & Architecture for MIH", IEEE 802.21, Media Independent Handover Working Group, Mar. 4, 2005; Retrieved from the internet: <URL:http://www.ieee802.org/21/doctreee/2005-03_meeting_docs/21-04-0164-04-0000-Freescale_March2005.ppt>.

Bhatt, et al. : "IEEE 802.21 Media Independent Handover Solution Proposal", IEEE 802.21, Media Independent Handover Working Group, Jan. 10, 2005; Retrived from the Internet: <URL:http://www.ieee802.org/21/doctree/2005-01_meeting_docs/21-04-0170-02-0000-bhatt_singh_Details_V1_0.ppt>.

* cited by examiner

FIG. 5
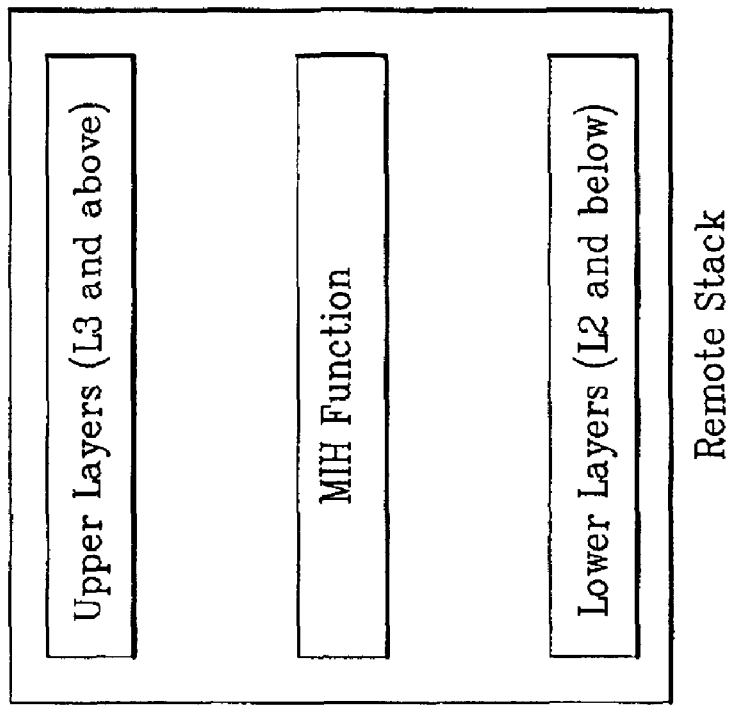
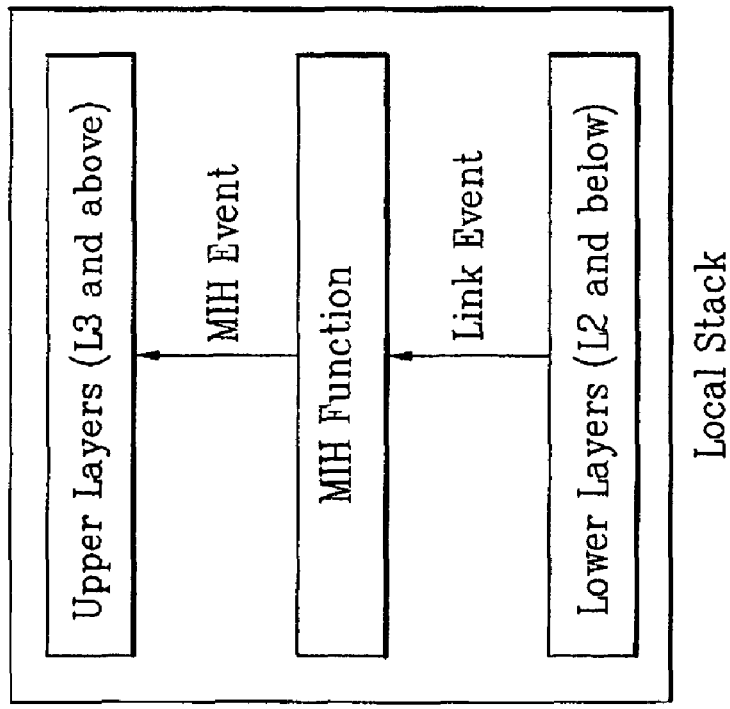

FIG. 8
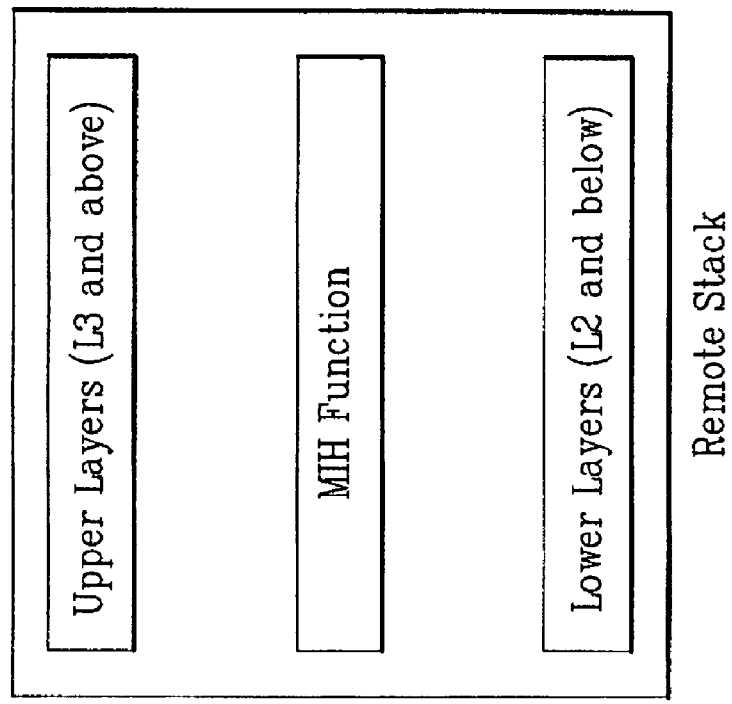
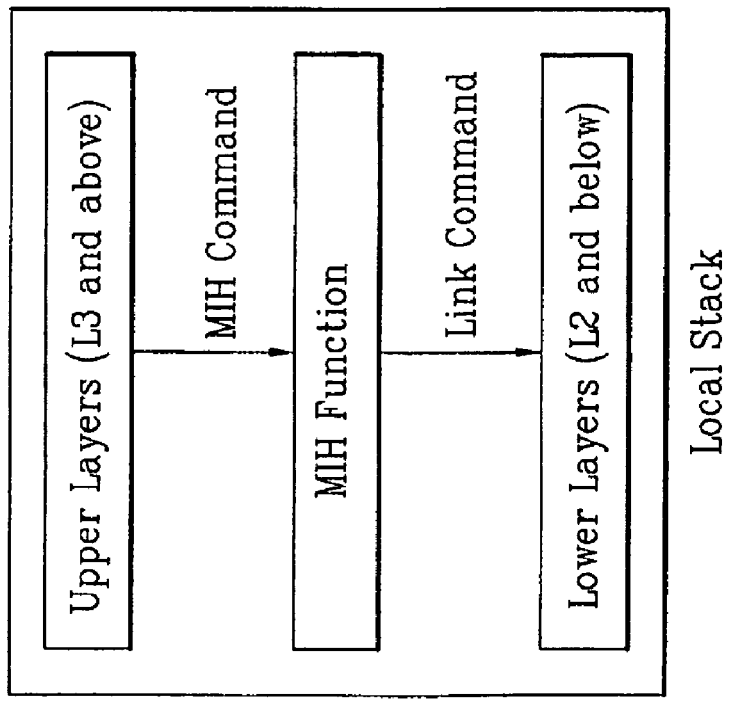

METHOD OF SUPPORTING HANDOVER IN A MULTI-MODE MOBILE STATION

This application is a continuation of U.S. application Ser. No. 11/416,890, filed May 2, 2006, now U.S. Pat. No. 7,649,867, which claims the benefit of earlier filing date and right of priority to Korean Application No. 10-2005-0036664, filed on May 2, 2005, and Korean Patent Application No. 10-2005-0040497, filed on May 16, 2005, the contents of which are hereby incorporated by reference herein in their entirety.

BACKGROUND OF THE INVENTION

1. Field of the Invention

The present invention relates to a method of supporting handover, and more particularly, to a method of supporting handover in a multi-mode mobile station. Although the present invention is suitable for a wide scope of applications, it is particularly suitable for supporting handover of a multi-mode mobile station in a wireless mobile communication system.

2. Discussion of the Related Art

Generally, the object of IEEE 802.21 in progress for International Standardization of Media Independent Handover between heterogeneous networks is to enhance user's convenience for Mobile Station (MS) devices by providing seamless handover and service continuity. Basic requirements here include a MIH function, an event trigger (or event service), a command service (CS) and an information service (IS) are defined as basic requirements.

A mobile station (MS), which can also be referred to as a mobile subscriber station (MSS) or a mobile terminal, is a multi-mode node that supports at least two interface types. Here, the interface can be, for instance, a wire-line type interface such as 802.3-based Ethernet, a wireless interface type based on IEEE 802.XX, such as IEEE 802.11, IEEE 802.15, IEEE 802.16 and the like, an interface type defined by cellular standardization organization such as $3^{rd}$ Generation Partnership Project (3GPP) and 3GPP2 and the like are possible.

FIG. 1 is a diagram of protocol stack architecture of a multi-modal MS. Referring to FIG. 1, the multi-modal MS comprises a Physical (PHY) layer per mode and a Medium Access Control (MAC) layer per mode. In addition, an MIH layer is placed below an Internet Protocol (IP) layer.

The MIH should be defined between IEEE802-series interfaces or between the 802-series interfaces such as the above-mentioned non-802-series interfaces defined by the cellular standardization organization such as 3GPP and 3GPP2. Moreover, a mobility supporting protocol of an upper layer such as Mobile IP and SIP (session initiation protocol) should be supported for the seamless handover service.

The MIH function is placed below the IP layer. Furthermore, the MIH function facilitates the handover process by using the input values from Layer 2 such as trigger event information and information of other networks. Moreover, the MIH function can include input values (e.g., user policy and configuration) which can affect the handover procedure. In addition, general interfaces (e.g., the Mobile IP and the SIP) are defined between Layer 3 entities and the MIH Function. These interfaces provide information associated with Layer 1 (i.e., PHY Layer) and Layer 2 (i.e., MAC Layer) as well as mobility management. The MIH function uses an event service (ES) to acquire information on lower layers and the network.

An Upper Management Entity (UPE) is located in the upper layer to monitor and control statuses of various links in the MS. Furthermore, the UPE is used to perform handover control function and device manager function. Here, the handover control function and the device manager can be independently located or can be included in the upper management entity.

In the present invention, the terms 'upper' and 'higher' are used interchangeably to describe the upper/higher management entity, upper/higher layers, and a like.

FIG. 2 illustrates a MS having a MIH function and a network having a functional entity and transmission protocol. In FIG. 2, the dotted lines represent services such as a primitive and the ES.

As illustrated in FIG. 2, for faster handover, the network layer uses the information from a link layer in order to quickly re-establish connection. The link layer event can be used to predict the user's movement and also can be used prepare for handover between the mobile terminal and the network. The trigger for handover procedure can be initiated from the PHY layer and the MAC layer. Moreover, the source of the trigger can be a local stack or a remote stack.

FIG. 3 illustrates a structure of a trigger model. An event trigger provides information related to the status of current signals, changes in status of other network, predictable changes as well as changes in the PHY layer and the MAC layer and changes in the properties of a certain network.

The event types can be classified into a PHY layer event, a MAC layer event, a management event, an L3 event, and an application event. A basic trigger event is as follows.

Link_Up notification is delivered when a Layer 2 connection is established on the specified link interface and when other upper layers can send higher layer packets. All Layer 2 activities in establishing the link connectivity are determined to be completed at this point of time. Here, the source of the Link_Up event is the Local MAC and the Remote MAC. Table 1 shows parameters of Link_Up notification.

TABLE 1

| Name | Type | Description |
| --- | --- | --- |
| EventSource | EVENT_LAYER_TYPE | Source of event |
| EventDestination | EVENT_LAYER_TYPE | Target of event |
| MacMobileTerminal | MAC Address | MAC address of MSS |
| MacOldAccess-Router | MAC Address | MAC address of previous access router |
| MacNewAccess-Router | MAC Address | MAC address of new access router |
| NetworkIdentifier | Media Specific | Network identifier for detecting change in subnet |

Link_Down notification is delivered when a Layer 2 connection is broken on the specified link and when no more packets can be sent on the specific link. Here, the source of the Link_Down event is the Local MAC. Table 2 shows parameters of Link_Down notification.

TABLE 2

| Name | Type | Description |
| --- | --- | --- |
| EventSource | EVENT_LAYER_TYPE | Source of event |
| EventDestination | EVENT_LAYER_TYPE | Target of event |
| MacMobileTerminal | MAC Address | MAC address of MSS |
| MacOldAccessRouter | MAC Address | MAC address of previous access router |
| ReasonCode | | Reason for disconnected link |

Link_Going_Down notification is delivered when a Layer 2 connection is expected (predicted) to go down (Link_Down) within a certain time interval. Link_Going Down event may be the indication to initiate handover procedures. Here, the source of the Link_Going_Down event is the Local MAC and the Remote MAC. Table 3 shows parameters of Link_Going_Down notification.

TABLE 3

| Name | Type | Description |
| --- | --- | --- |
| EventSource | EVENT_LAYER_TYPE | Source of event |
| EventDestination | EVENT_LAYER_TYPE | Target of event |
| MacMobileTerminal | MAC Address | MAC address of MSS |
| MacOldAccessRouter | MAC Address | MAC address of previous access router |
| MacNewAccessRouter | MAC Address | MAC address of new access router |
| TimeInterval | Time in msecs | Predicted time for Link_Down |
| ConfidenceLevel | % | Predicted specific time for Link_Down |
| UniqueEventIdentifier | | Use when Event_Rollback happens |

Link_$_{Going}$_Up notification is delivered when a Layer 2 connection is expected (predicted) to go up (Link_Up) within a certain time interval. Moreover, the notification is used when excessive amount of time is expanded in initializing the network. Here, the source of the Link_Going_Up event is the Local MAC and the Remote MAC. Table 4 shows parameters of Link_Going_Up notification.

TABLE 4

| Name | Type | Description |
| --- | --- | --- |
| EventSource | EVENT_LAYER_TYPE | Source of event |
| EventDestination | EVENT_LAYER_TYPE | Target of event |
| MacMobileTerminal | MAC Address | MAC address of MSS |
| MacNewAccessRouter | MAC Address | MAC address of new access router |
| TimeInterval | Time in msecs | Predicted time for Link_Down |
| ConfidenceLevel | % | Predicted specific time for Link_Down |
| UniqueEventIdentifier | | Use when Event_ Rollback happens |

Link_Event_Rollback indication is used in conjunction with Link_Going_Down. That is, it combines Link_Going_Up and Link_Going_Down for use. More specifically, if the link is no longer expected to go up (Link_Up) or go down (Link_Down) in the specified time interval, then a Link_Event_Rollback message is sent to the Event destination. Here, the source of the Link_Event_Rollback event is the Local MAC and the Remote MAC. Table 5 shows parameters of Link_Event_Rollback inciation.

TABLE 5

| Name | Type | Description |
| --- | --- | --- |
| EventSource | EVENT_LAYER_TYPE | Source of event |
| EventDestination | EVENT_LAYER_TYPE | Target of event |
| MacMobileTerminal | MAC Address | MAC address of MSS |
| MacNewAccessRouter | MAC Address | MAC address of new access router |
| UniqueEventIdentifier | | Use when Event_Rollback happens |

Link_Available indicates a new available link. That is, Link_Available indicates the possibility that a new base station or a point of attachment (PoA) can provide better link quality than that of the PoA (which can be also referred to as an access point, a base station, or a network entity) to which the MS is connected. Here, the source of the Link_Available event is the Local MAC and the Remote MAC. Table 6 shows parameters of Link_Available.

TABLE 6

| Name | Type | Description |
| --- | --- | --- |
| EventSource | EVENT_LAYER_TYPE | Source of event |
| EventDestination | EVENT_LAYER_TYPE | Target of event |
| MacMobileTerminal | MAC Address | MAC address of MSS |
| MacNewAccessRouter | MAC Address | MAC address of new access router |
| MacOldAccessRouter | MAC Address | MAC address of previous access router |

Link_Parameters_Change indicates changes in link parameters when specified threshold levels are crossed. This may include link layer parameters such as speed of the link, Quality of Service (QoS), Bit Error Rate (BER), etc. The threshold level for each such parameter can be configured through a separate command to link layer. Here, the source of the Link_Parameters_Change event is the Local MAC and the Remote MAC. Table 7 show parameters of Link_Parameters_Change.

TABLE 7

| Name | Type | Description |
| --- | --- | --- |
| EventSource | EVENT_LAYER_TYPE | Source of event |
| EventDestination | EVENT_LAYER_TYPE | Target of event |
| MacMobileTerminal | MAC Address | MAC address of MSS |
| MacAccessRouter | MAC Address | MAC address of access router |
| oldValueOfLinkParameter | | Previous value of link parameter |
| oldValueOfLinkParameter | | New value of link parameter |

FIG. 4 illustrates a trigger when establishing a new link due to decreased quality of the current link.

An Information Service (IS) provides a framework by which a MIH Function both in the mobile terminal and in the network can discover and obtain network information within a geographical area to facilitate handovers. Here, the IS is accessible to any network. The IS includes the following information elements, such as a link access parameter, a security mechanism, a neighbor map, a location, a cost of link, and a provider and other access information.

The conventional art defines the ES, CS, and IS for the MIH. However, when the ES, CS, and IS are transmitted/received between a local stack and a remote stack based on the MIH messages, there is not a defined MIH protocol procedure, a MIH header, and a message format.

SUMMARY OF THE INVENTION

Accordingly, the present invention is directed to a method of supporting handover in a multi-mode mobile station that substantially obviates one or more problems due to limitations and disadvantages of the related art.

An object of the present invention is to provide a method of discovering at least one of a homogeneous and a heterogeneous network module to perform handover with in a wireless mobile communication network.

Another object of the present invention is to provide an apparatus for discovering at least one of a homogeneous and a heterogeneous network module to perform handover with in a wireless mobile communication network.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method discovering at least one of a homogeneous and a heterogeneous network module to perform handover with in a wireless mobile communication network includes establishing a network handover module for converging information from at least one network interface module associated with at least one of a homogeneous and a heterogeneous network handover module into a unified presentation and transmitting a broadcast request message from a mobile station (MS) to a source point of attachment (PoA) which transmits the broadcast request message to at least one interface module to identify whether the at least one interface module supports at least one of the homogeneous and the heterogeneous network handover module and a capability of the at least one of the homogeneous and the heterogeneous network handover module. The method further includes initiating a timer for a specified time period when the broadcast request message is transmitted and receiving at least one response message from the at least one interface module via the source PoA prior to expiration of the timer, wherein the response message indicates that the at least one interface module supports at least one of the homogeneous and the heterogeneous network handover module and the capability of the at least one of the homogeneous and the heterogeneous network handover module.

In another aspect of the present invention, a method includes establishing a network handover module for converging information from at least one network interface module associated with at least one of a homogeneous and a heterogeneous network handover module into a unified presentation and transmitting a request message from a mobile station (MS) to a target module to identify whether the target module supports at least one of the homogeneous and the heterogeneous network handover module and a capability of the at least one of the homogeneous and a heterogeneous module, wherein the request message includes an address of the target module. The method further includes initiating a timer for a specified time period when the request message is transmitted and receiving a response message from the target module prior to expiration of the timer, wherein the response message indicates that the target module supports the at least one of the homogeneous and the heterogeneous network handover module and a capability of the at least one of the homogeneous and the heterogeneous module.

In further aspect of the present invention, an apparatus for discovering at least one of a homogeneous and a heterogeneous network module to perform handover with in a wireless mobile communication network includes a controller for establishing a network handover module for converging information from at least one network interface module associated with at least one of a homogeneous and a heterogeneous network handover module into a unified presentation and for initiating a timer for a specified time period when the broadcast request message is transmitted. The apparatus further includes a transmitter for transmitting a broadcast request message from the apparatus to a source point of attachment (PoA) which transmits the broadcast request message to at least one interface module to identify whether the at least one interface module supports at least one of the homogeneous and the heterogeneous network handover module and a capability of the at least one of the homogeneous and the heterogeneous network handover module, and a receiver for receiving at least one response message from the at least one interface module via the source PoA prior to expiration of the timer, wherein the response message indicates that the at least one interface module supports at least one of the homogeneous and the heterogeneous network handover module and the capability of the at least one of the homogeneous and the heterogeneous network handover module.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings;

FIG. 5 illustrates an architecture of a MIH event and a link event according to an embodiment of the present invention;

FIG. 8 illustrates an architecture of a MIH command and a link command according to an embodiment of the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

In the present application, the term mobile station (MS) can also be referred by a mobile subscriber station (MSS), a mobile terminal (MT), a mobile node (MN), a terminal, and a like.

FIG. 5 illustrates an architecture of a MIH event and a link event according to an embodiment of the present invention. More specifically, the MIH event includes event information that is transmitted from the MIH to the upper management entity (UPE) or to upper (or higher) layers. With respect to the conventional art, the MIH event corresponds to event trigger. The link event is transmitted from the lower layers (e.g., MAC layer or physical layer) to the MIH. Furthermore, the link event uses primitives used in interfaces with the MAC layer or the physical (PHY) layer.

Figure 1:
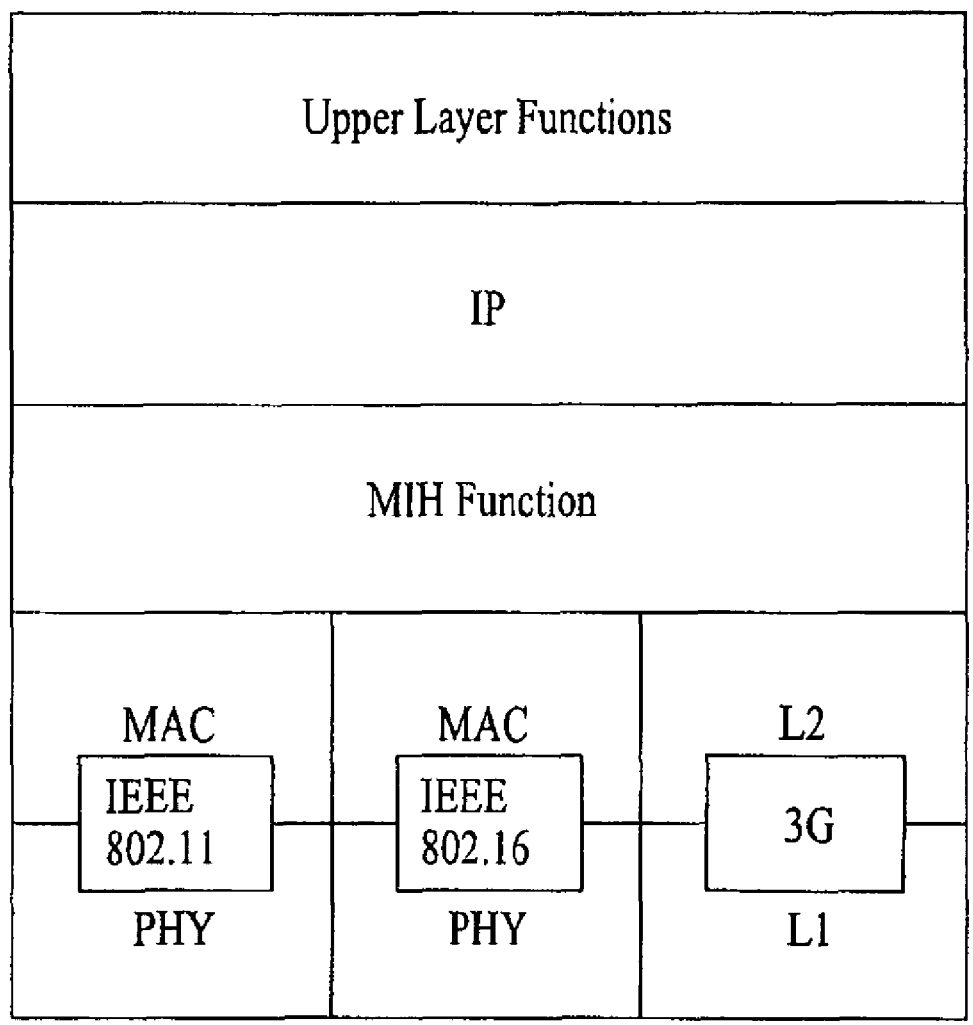
FIG. 1 is a diagram of protocol stack architecture of a multi-modal MS.
Figure 2:
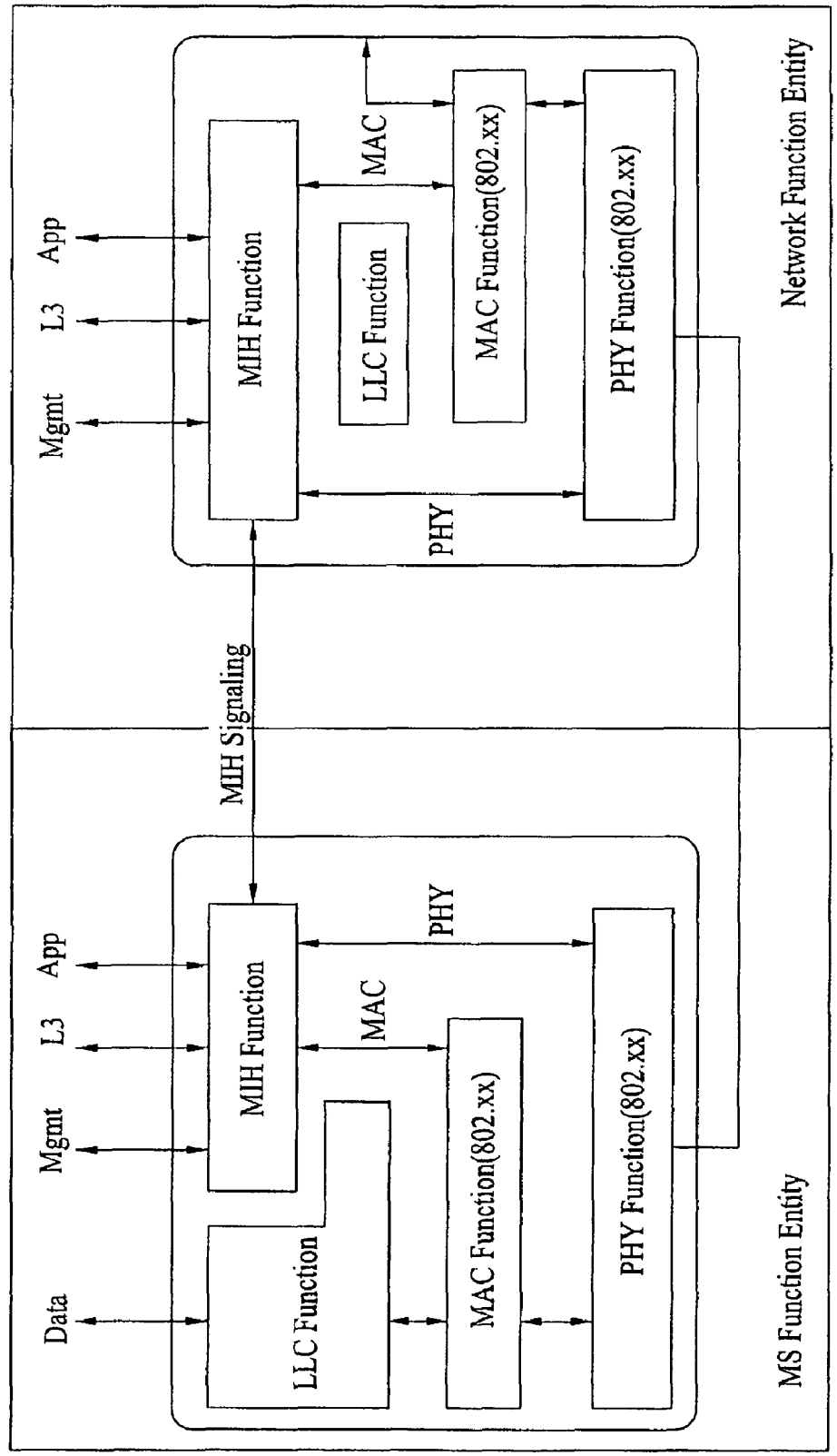
FIG. 2 illustrates a MS having a MIH function and a network having a functional entity and transmission protocol.
Figure 3:
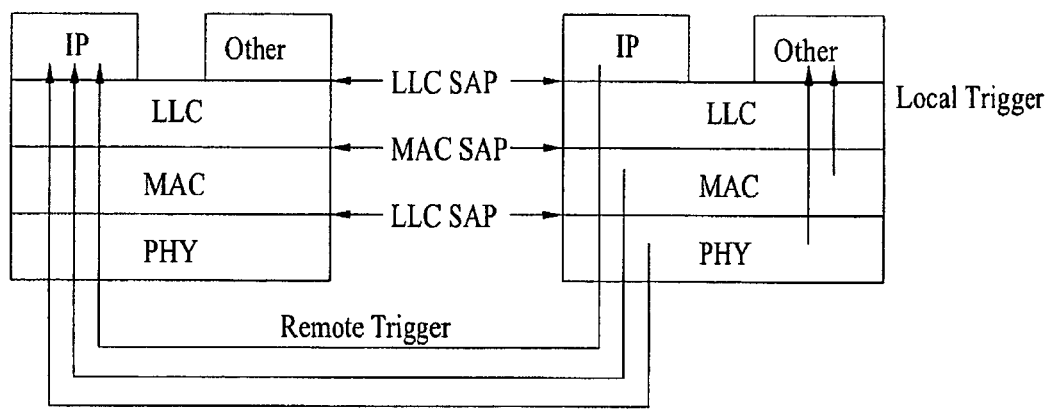
FIG. 3 illustrates a structure of a trigger model.
Figure 4:
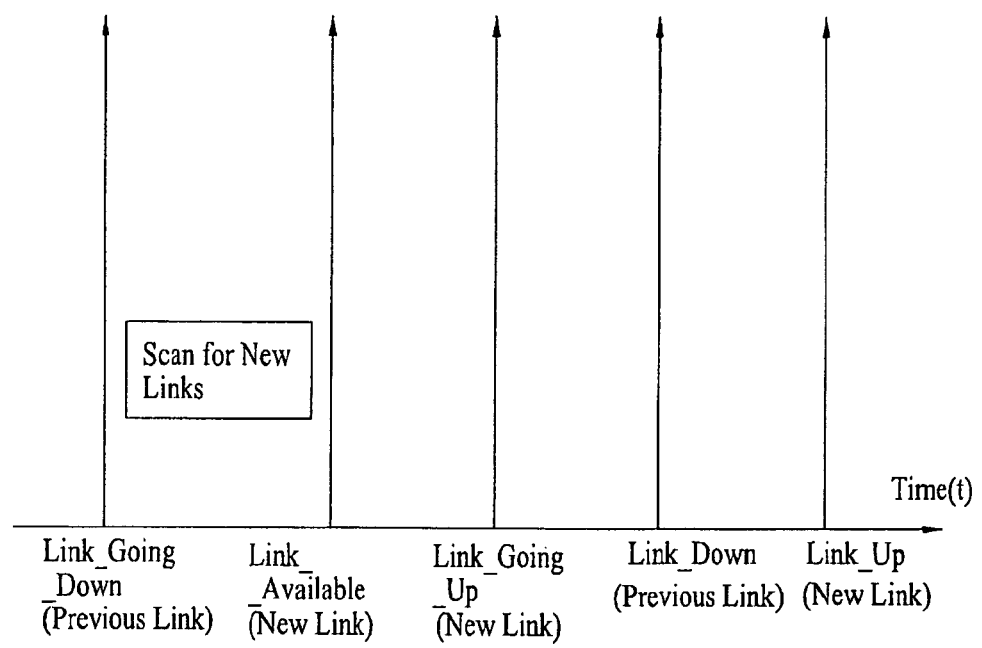
FIG. 4 illustrates a trigger when establishing a new link due to decreased quality of the current link.
Figure 6:
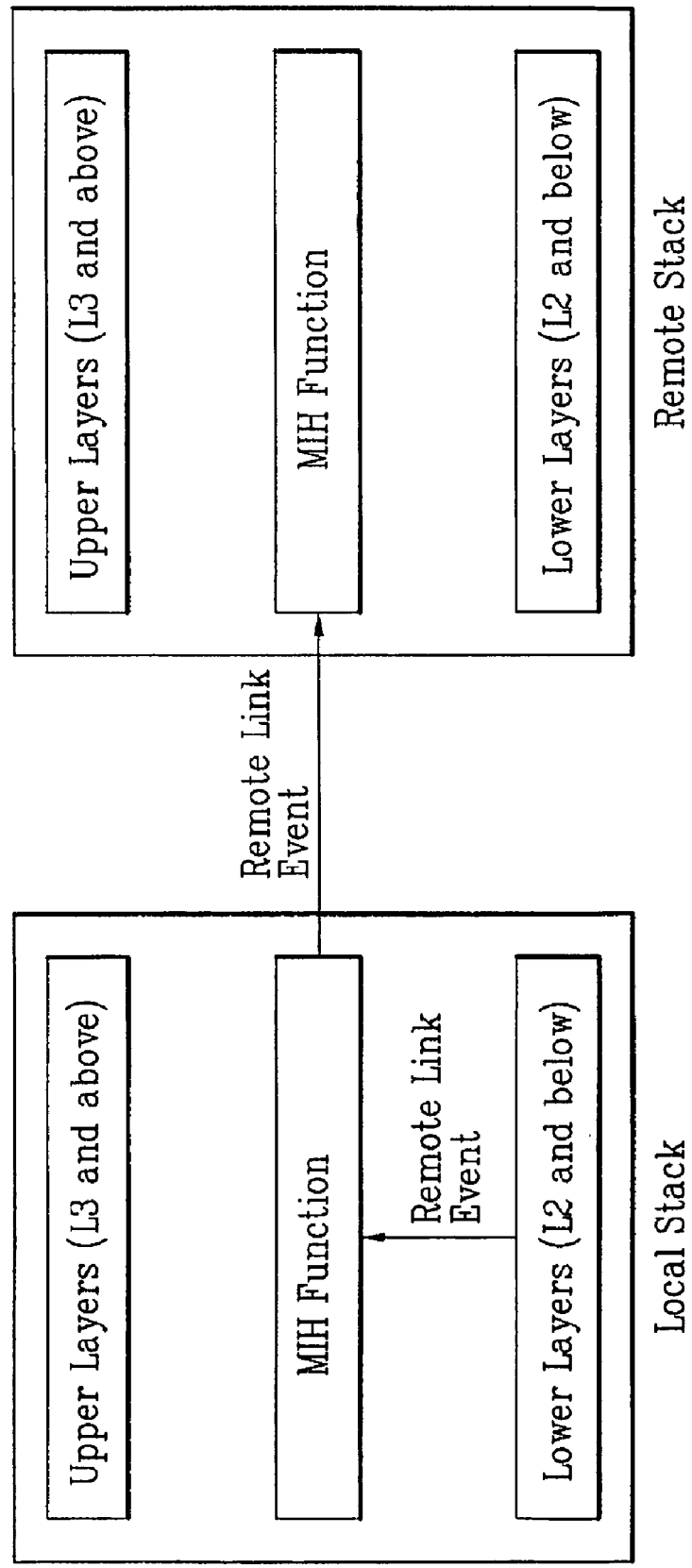
FIG. 6 illustrates an architecture of a remote link event according to an embodiment of the present invention.

FIG. 6 illustrates an architecture of a remote link event according an embodiment of the present invention. Referring to FIG. 6, if an event is triggered from the lowers layers of a local stack to the MIH in the same lower stack, the MIH of the local stack transmits the event information to the MIH of the remote stack. Alternatively, if an event is triggered from the lower layers of a remote stack to the MIH of the same remote stack, the MIH of the remote stack transmits the event information to the MIH of the local stack.

Figure 7:
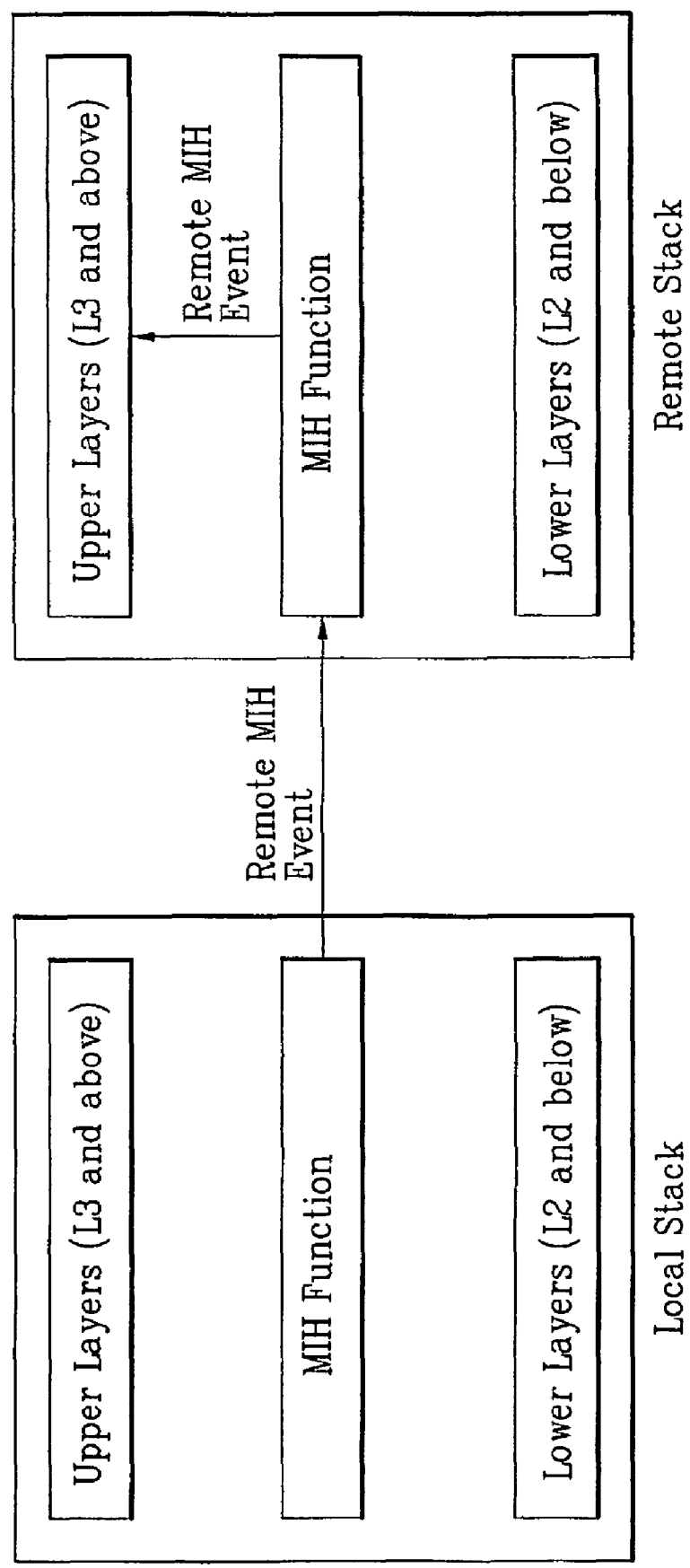
FIG. 7 illustrates an architecture of a remote MIH event according to an embodiment of the present invention.

FIG. 7 illustrates an architecture of a remote MIH event according to an embodiment of the present invention. In FIG. 7, the MIH of the local stack triggers the MIH event and transmits the event information to the MIH of the remote stack. After receiving the event information, the MIH of the remote stack transmits the received event information to the upper management entity (UPE) or to the upper layers. Alternatively, if the MIH of the remote stack triggers an event to the MIH of the local stack, the MIH of the local stack transmits the event information to upper layers of the local stack.

Figure 9:
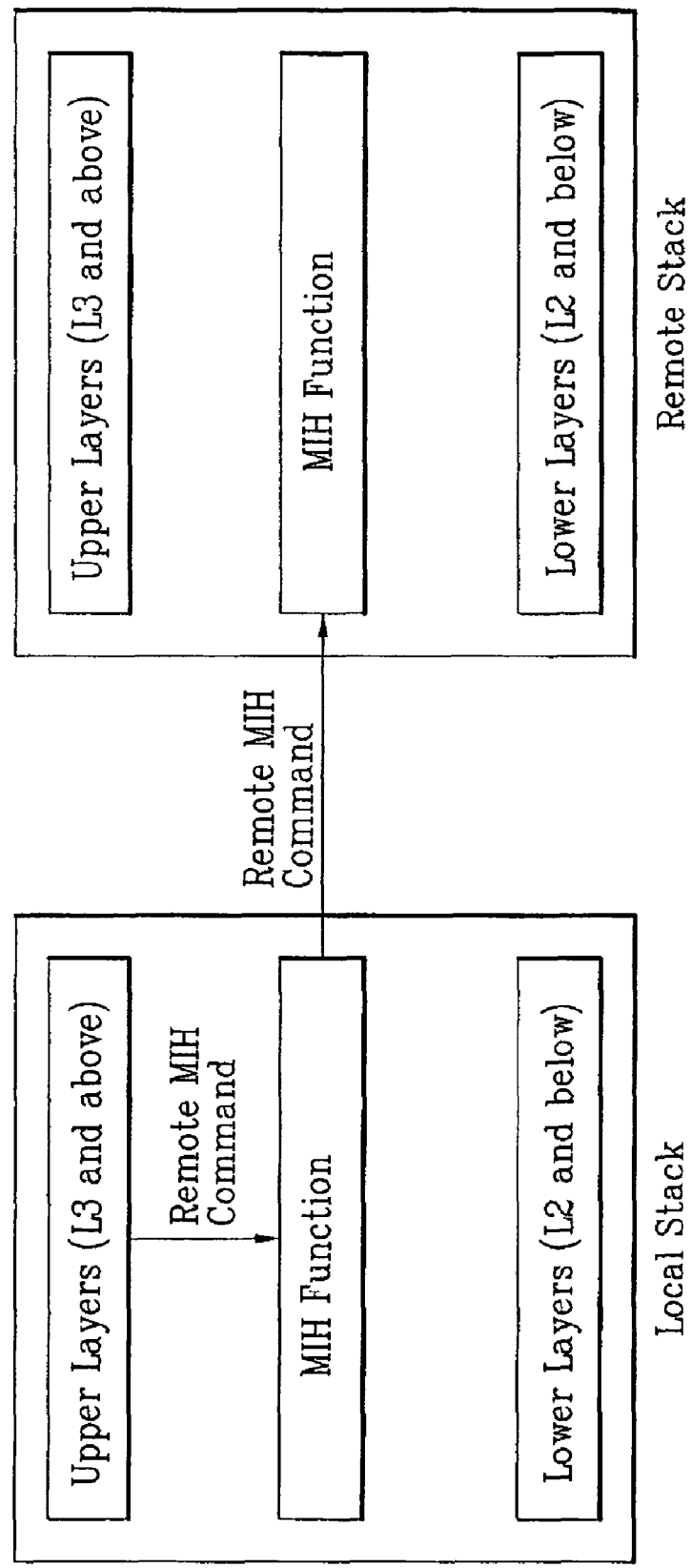
FIG. 9 illustrates an architecture of a remote MIH command according to an embodiment of the present invention.

FIG. 8 illustrates an architecture of a MIH command and a link command according to an embodiment of the present invention. The MIH command is generated at the UPE or the upper layers and transmitted to the MIH with instructions. The link command is generated at the MIH and transmitted to the lower layers with instructions. FIG. 9 illustrates an architecture of a remote MIH command according to an embodiment of the present invention. In FIG. 9, the UPE or the upper layers of the local stack generates and transmits the remote MIH command to the MIH. After receiving the MIH command, the MIH transmits the received MIH command to the MIH of the remote stack. Alternatively, the MIH command is transmitted from the upper layers of the remote stack to the MIH of the remote stack, and subsequently, the MIH of the remote stack transmits the MIH command to the MIH of the local stack.

Figure 10:
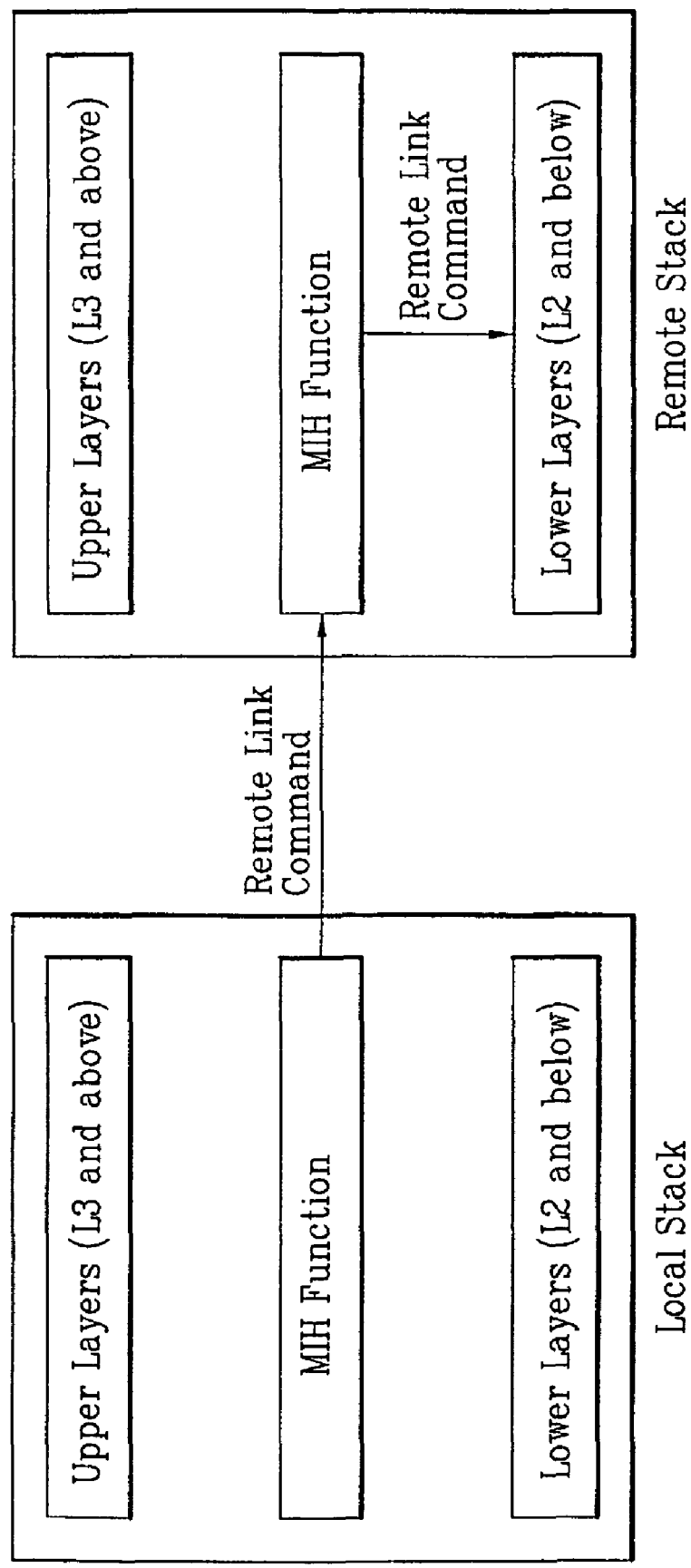
FIG. 10 illustrates an architecture of a remote link command according to an embodiment of the present invention.

FIG. 10 illustrates an architecture of a remote link command according to an embodiment of the present invention. In FIG. 10, the MIH of the local stack generates and transmits the remote link command to the MIH of the remote stack. The MIH of the remote stack then transmits the received remote link command to the lower layers of the remote stack. Alternatively, the MIH of the remote stack transmits the remote link command to the MIH of the local stack, which in turn, transmits the remote link command to the lower layers of the local stack.

Figure 11:
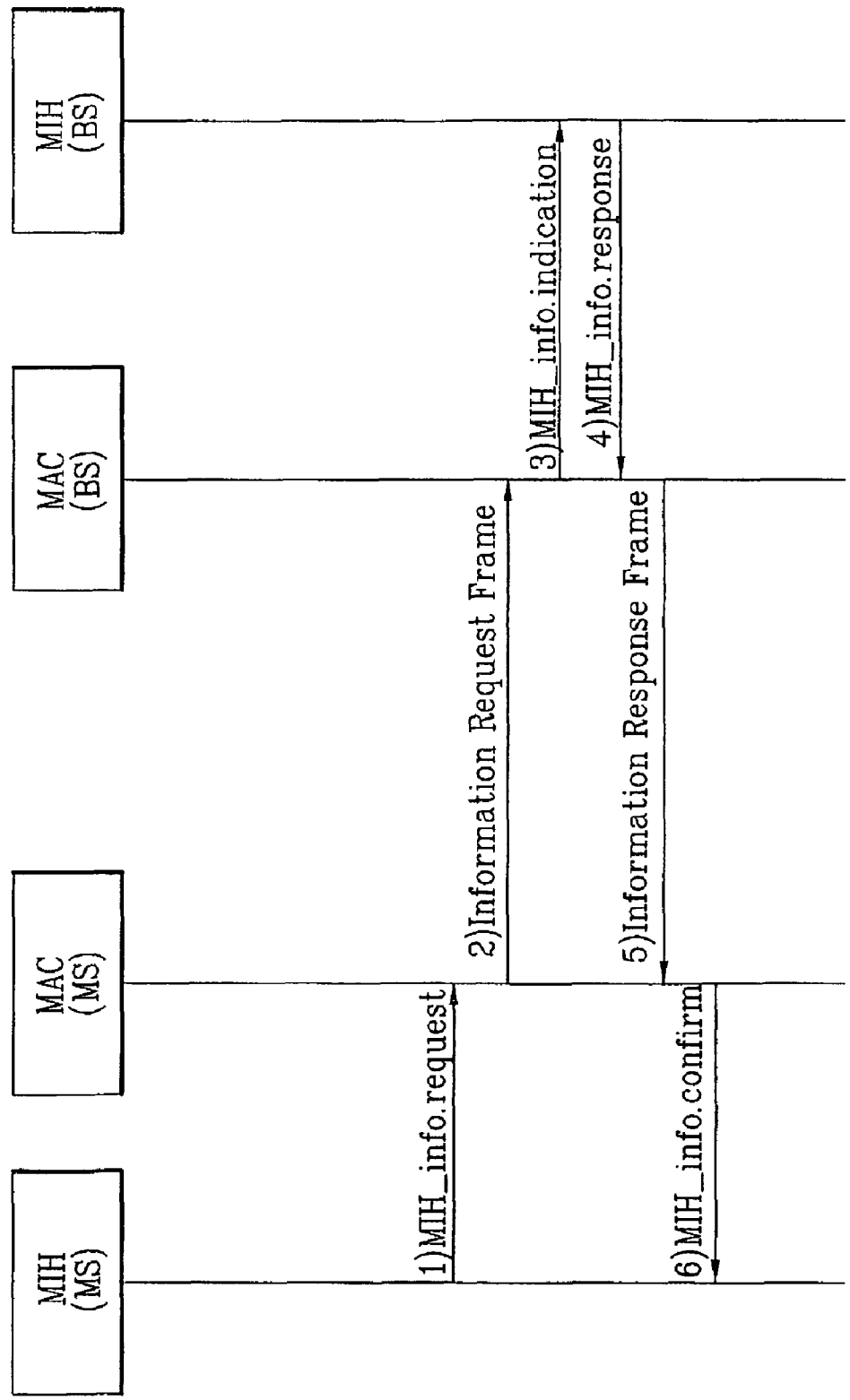
FIG. 11 illustrates a flow of a media independent information service of a MS according to an embodiment of the present invention.

FIG. 11 illustrates a flow of a media independent information service of a MS according to an embodiment of the present invention. Initially, the MIH of the MS sends a MIH_info.request message to the MAC of the MS to request for information service. Upon receiving the request message, the MAC of the MS sends an Information Request Frame to the MAC of a base station (BS). The MAC of the BS then sends the request by the MS to the MIH of the BS via MIH_info.indication message. In response, the MIH of the BS sends a media independent information service via MIH_info.response message to the MAC of the BS. Then, the MAC of the BS sends an Information Response Frame to the MAC of the MS. Upon receipt of the Information Response Frame, the MAC of the MS sends the received information service to the MIH of the MS via MIH_info.confirm message.

MIH protocol comprises the following three stages. A first stage is defined by a MIH capability discovery. This stage relates to discovering by the MIH of the MS or the MIH of the BS/access router which entity of the network supports MIH function. Next, MIH registration represents the next stage. In this stage, the MIHs of different entities perform registration processes with each other in order to initiate MIH protocol. Lastly, MIH message exchange stage represents two registered MIHs transmit/receive MIH messages using a MIH payload and MIH protocol.

Figure 12:
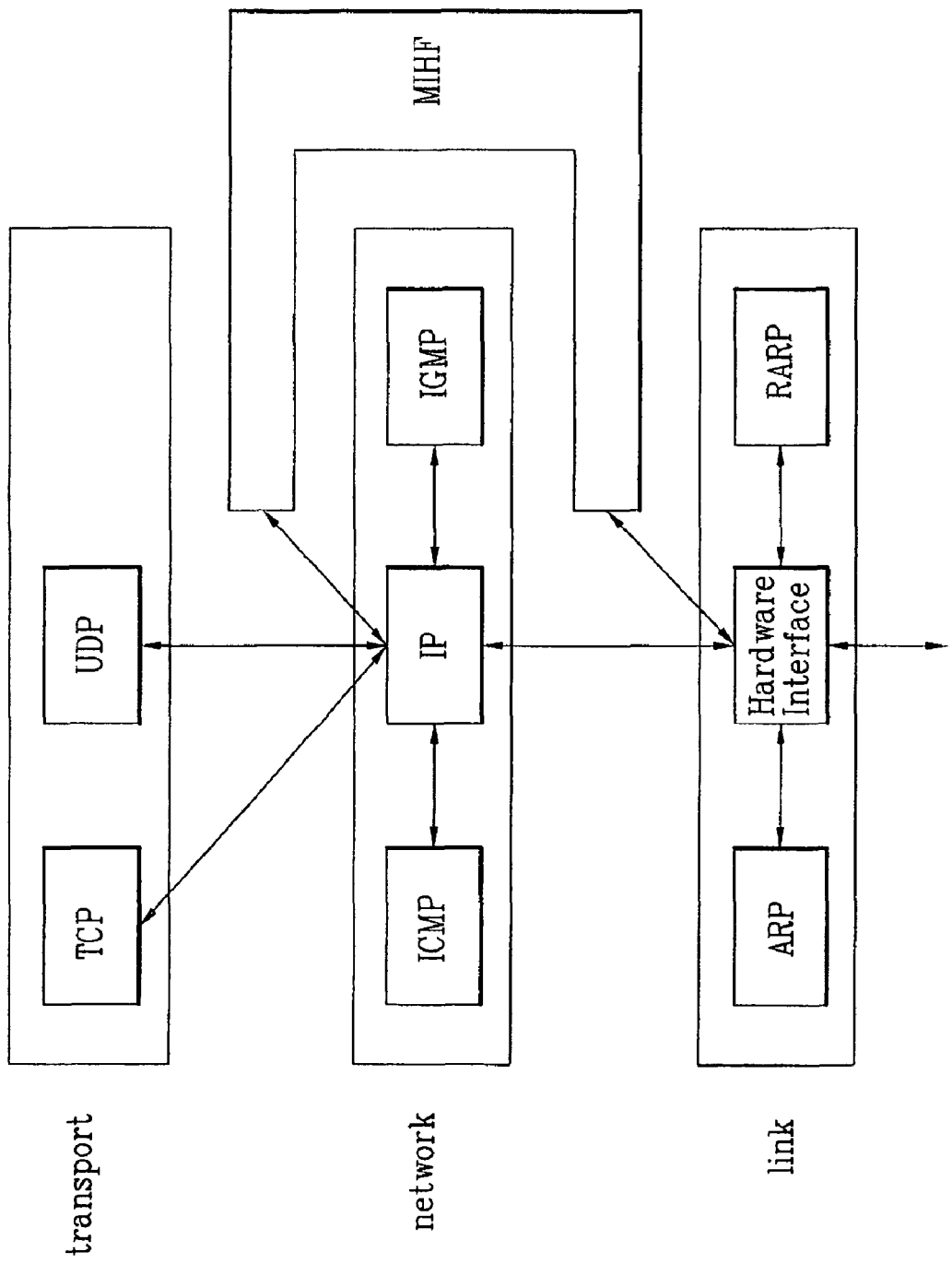
FIG. 12 illustrates a relationship between MIH function and other protocol layers in a protocol stack according to an embodiment of the present invention.
Figure 13:
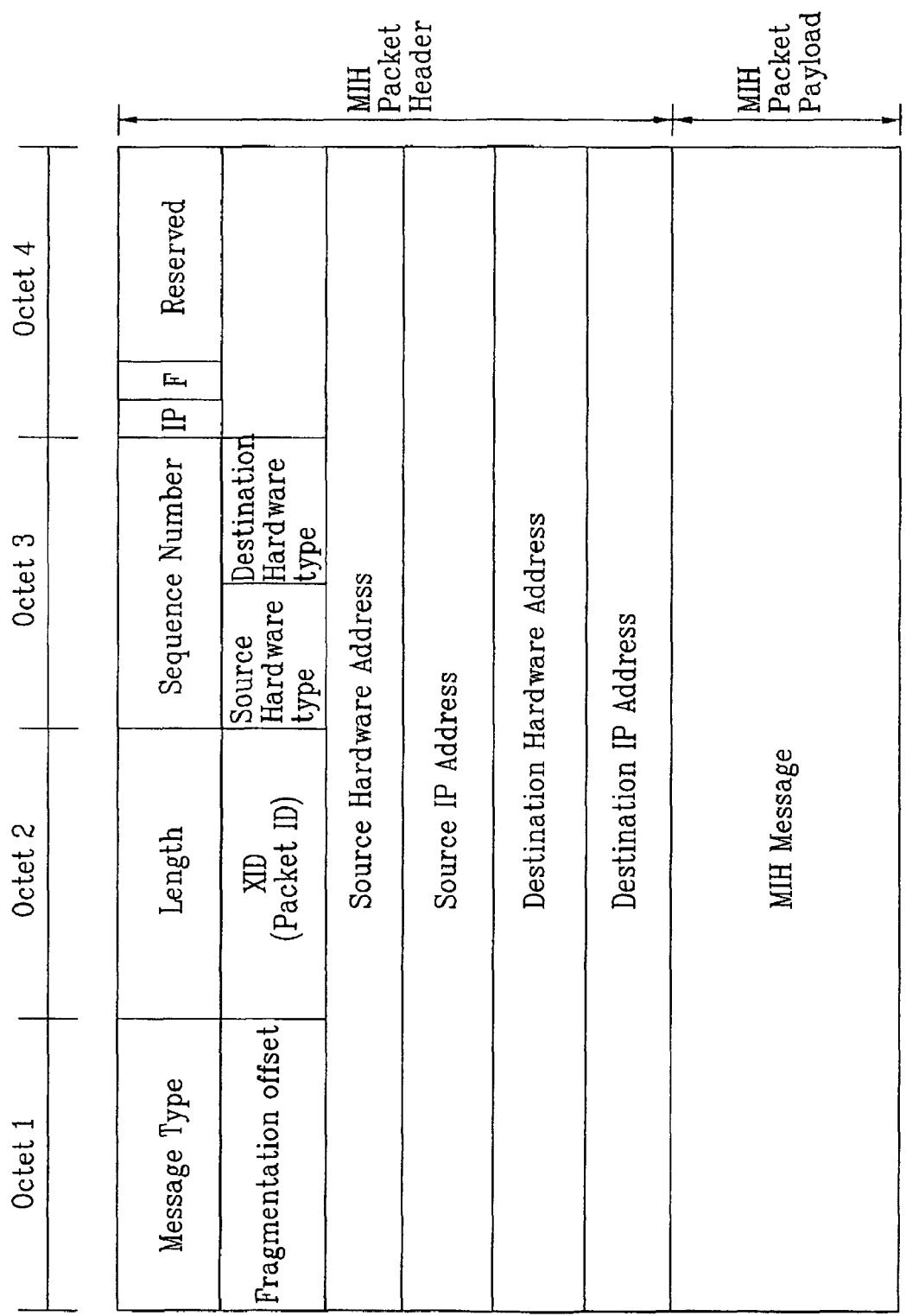
FIG. 13 illustrates a message format of a MIH packet according to an embodiment of the present invention.

FIG. 12 illustrates a relationship between MIH function and other protocol layers in a protocol stack according to an embodiment of the present invention. FIG. 13 illustrates a message format of a MIH packet according to an embodiment of the present invention. The details of each field are as follows.

A 'Message Type' field (Octet 1) represents different messages based on message type as shown in Table 8.

TABLE 8

| MIH Message Type | MIH Message Name | Category |
|---|---|---|
| 1 | MIH_Capability_Discover.request | Capability Discovery |
| 2 | MIH_Capability_Discover.response | Capability Discovery |
| 3 | MIH_Capability_Discover.advertisement | Capability Discovery |
| 4 | MIH_Registration.request | Registration |
| 5 | MIH_Registration.response | Registration |
| 6 | MIH_Deregistration.request | Registration |
| 7 | MIH_Deregistration.confirm | Registration |
| 8 | MIH_Event_Register.request | Registration |
| 9 | MIH_Event_Register.confirm | Registration |
| 10 | MIH_Event_Deregister.request | Registration |
| 11 | MIH_Event_Deregister.confirm | Registration |
| 12 | MIH_Link_Up.indication | Event Service |
| 13 | MIH_Link_Down.indication | Event Service |
| 14 | MIH_Link_Going_Down.indication | Event Service |
| 15 | MIH_Link_Event_Rollback.indication | Event Service |
| 16 | MIH_Link_Parameters_Change.indication | Event Service |

TABLE 8-continued

| MIH Message Type | MIH Message Name | Category |
|---|---|---|
| 17 | MIH_Link_Event_Discover.request | Command Service |
| 18 | MIH_Link_Event_Discover.confirm | Command Service |
| 19 | MIH_Network_Address_Information.request | Command Service |
| 20 | MIH_Network_Address_Information.response | Command Service |
| 21 | MIH_Handover_Pre-notification.request | Command Service |
| 22 | MIH_Handover_Pre-notification.response | Command Service |
| ... | ... | ... |
| 23+ | Reserved | Reserved |

A 'Length' field (Octet 1) represents a total length of the entire header including the MIH message. A 'Sequence Number' field (Octet 1) represents a total count of message transmissions. An 'IP' field (1 bit) indicates whether an internet protocol (IP) address included in the header is associated with IPv4 or IPv6 (e.g., 0: IPv4, 1: IPv6). A 'F' field (1 bit) indicates whether the message is fragmented or not (e.g., 0: no fragmentation, 1: fragmentation).

A 'Fragmentation Offset' field (Octet 1) indicates remaining number of packets needed to form a complete message if one packet is insufficient to form a complete message. A 'XID (Packet ID)' field (Octet 1) is used to match each request message to each confirmation message. A 'Source Hardware Type' field (4 bits) indicates a hardware type of the transmitting end (e.g., 0000: IEEE 802.3 interface, 0001: IEEE 802.11 interface, 0010: IEEE 802.16 interface, 0011: 3GPP interface, 0100: 3GPP2 interface, 0101-11111: reserved).

A 'Destination Hardware Type' field (4 bits) indicates a hardware type of the receiving end (e.g., 0000: IEEE 802.3 interface, 0001: IEEE 802.11 interface, 0010: IEEE 802.16 interface, 0011: 3GPP interface, 0100: 3GPP2 interface, 0101-11111: reserved). A 'Source Hardware Address' field represents a hardware address of the transmitting end (e.g., Layer 2 address). A 'Source IP Address' field represents the IP address of the receiving end. A 'Destination Hardware Address' field represents a hardware address of the transmitting end (e.g., Layer 2 address). A 'Destination IP Address' field represents the IP address of the receiving end. A 'MIH Message' includes actual messages of a remote event registration, event, service, and command service in a Type, Length, Value (TLV) format.

Figure 14:
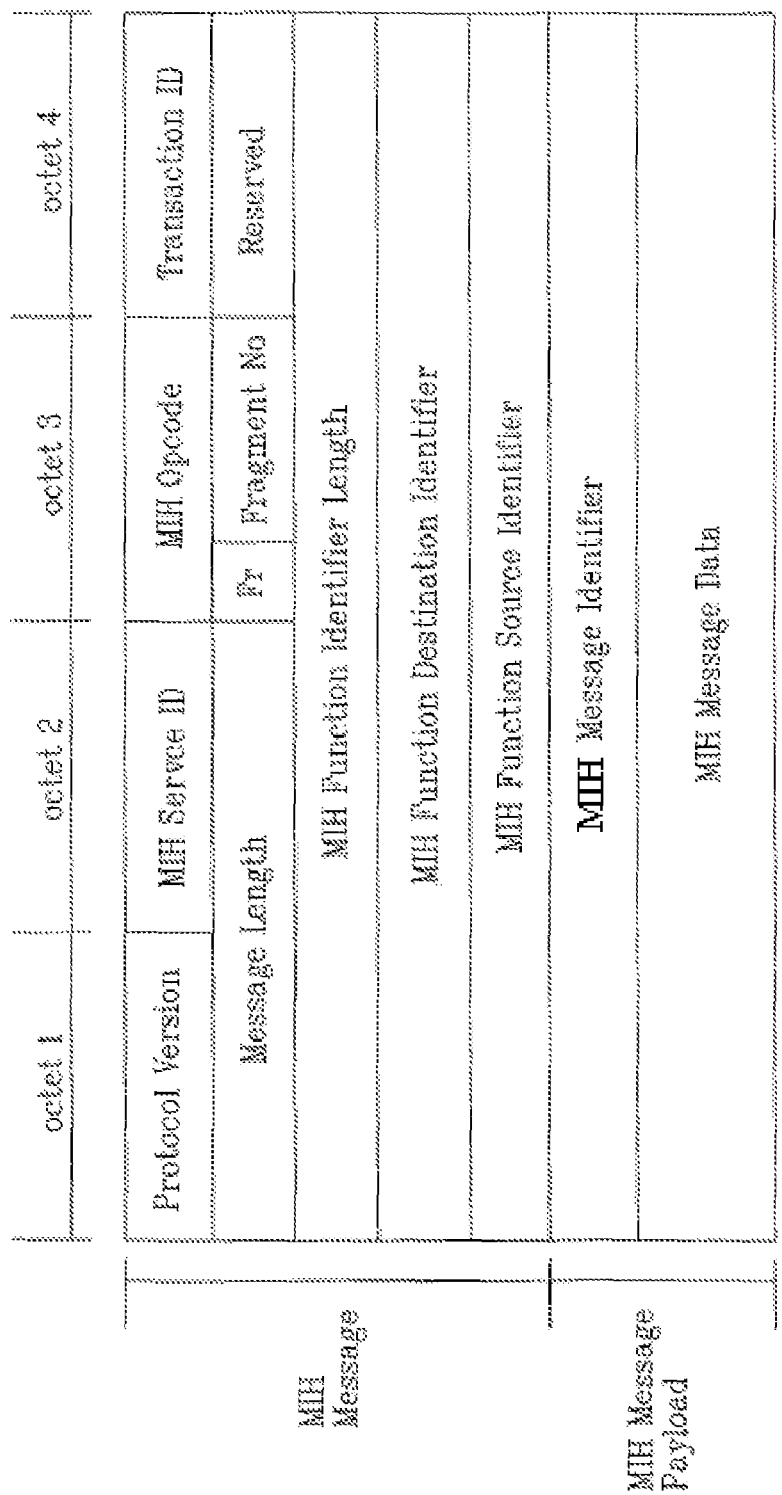
FIG. 14 illustrates a message format of a MIH packet according to another embodiment of the present invention.

FIG. 14 illustrates a message format of a MIH packet according to another embodiment of the present invention. The details of each field of FIG. 14 are as follows.

A 'Protocol Version' field represents a version of the MIH protocol, and the basic value is '0x01.' A 'MIH Service ID' field is a identifier of the MIH service (e.g., 1: Event Service; 2: Command Service; 3: Information Service). A 'MIH Opcode' field defines an operation to the performed (e.g., 1: Request; 2: Response; 3: Indication). A 'Transaction ID' field is used to match a request message to a response message. A 'Fr' field represents a fragmentation flag (e.g., 1: current packet is fragmented at least once; 2: current packet is not fragmented). A 'Fragment No.' field indicates a fragmentation number of a packet. A 'Message Length' field represents a total length of an entire message.

Furthermore, a 'MIH Function Identifier Length (MIHFL)' field indicates a length of each 'Source/Destination MIH Identifier' field. A 'Source MIH Function Identifier' field identifies the MIH of the transmitting end and can have a Layer 2 hardware address or an IP-based Layer 3 address. Alternatively, this field can be a new MIH address identifier. A 'Destination MIH Function Identifier' field identifies the MIH of the receiving end and can have a Layer 2 hardware address or an IP-based Layer 3 address. Alternatively, this field can be a new MIH address identifier.

A 'MIH Message ID' field identifies an actual MIH message and is shown in Table 9.

TABLE 9

| No. | MIH Message Identifier | MIH Opcode | Category |
|---|---|---|---|
| 1 | MIH Event Discover | Request, Response | Capability Discovery |
| 2 | MIH Event Register | Request, Response | Registration |
| 3 | MIH Event Deregister | Request, Response | Registration |
| 4 | MIH Link Event Configure | Request, Response | Event Configuration |
| 5 | MIH Link Up | Indication | Event Service |
| 6 | MIH Link Going Down | Indication | Event Service |
| 7 | MIH Link Event Rollback | Indication | Event Service |
| 8 | MIH Link Parameters Change | Indication | Event Service |
| 9 | MIH SDU Transmit Success | Indication | Event Service |
| 10 | MIH SDU Transmit Failure | Indication | Event Service |
| 11 | MIH Command Discover | Request, Response | Command Service |
| 12 | MIH Network Address Information | Request, Response | Command Service |
| 13 | MIH Handover Initiate | Request, Response | Command Service |
| 14 | MIH Handover Prepare | Request, Response | Command Service |
| 15 | MIH Handover Complete | Request, Response | Command Service |
| 16 | MIH Information Request | Request | Information Service |
| 17 | MIH Information Response | Response | Information Service |
| 18 | MIH Capability Discovery Request | Request | MIH Capability Discovery |
| 19 | MIH Capability Discovery Response | Response | MIH Capability Discovery |
| 20+ | Reserved | | Reserved |

A 'MIH Message Data' field indicates a particular data of a MIH service.

As discussed above, the MIH packet can have a message format of FIG. 13 or FIG. 14.

A signal message between MIHs can be classified by 'MIH Capability Discovery,' 'MIH Remote Event Registration,' 'MIH Remote Event Service,' and 'MIH Remote Command Service.'

In order for the MS, the PoA (e.g., a wireless PoA, broadband wireless access network BS, cellular system BS), a network entity (e.g., a router, foreign agent) to discover MIH capability of the corresponding entity (e.g., a MS, PoA, network entity), the formats of the MIH packet are used to classify different methods.

As a first method, if the MIH packet is represented by the format of FIG. 13, a MIH_Capability_Discover.request message and a MIH_Capability_Discovery.response message can be used to discover a MIH capability of the corresponding entity.

The MIH_Capability_Discover.request message does not include a MIH message payload and is included in a MIH header in which the 'Message Type' field is set to '1.' This message can be transmitted via Layer 2 or Layer 3. If the transmitting entity does not know the exact address of the receiving entity, a broadcast message can be used to discover which entity of the network possesses the MIH function. Alternatively, even though the transmitting entity knows the address of the receiving entity, if the transmitting entity desires to know whether the receiving entity has the MIH function, the message is sent in unicast.

If the receiving entity of the MIH_Capability_Discovery.request message has the MIH function, then it can respond by transmitting the MIH_Capability_Discovery.response message. This message also does not include the MIH message payload and is included only in the MIH header in which the 'Message Type' field is set to '1.' As is the case in the request message, this response message can be sent via Layer 2 or Layer 3. Here, the destination address included in the MIH header is assigned with a duplicated source address of the MIH Capability Discovery.request message, and the source address is assigned with its own address. Furthermore, the entity with the MIH function can advertise periodically its MIH capability via Layer 2 or Layer 3.

As a second method, if the MIH packet is represented by the format of FIG. 14, the payload part of FIG. 14 can be removed and transmit the MIH header only to the corresponding entity in order to discover whether the corresponding entity has MIH capability or not. After receiving the MIH header, the receiving entity responds by transmitting its MIH header using the 'Source Address' field from the received header. Such an action is possible if the receiving entity has the MIH capability.

As a third method, if the MIH packet is represented by the format of FIG. 14, a MIH message data can be removed and transmit the MIH header and a MIH Message Identifier in order to discover whether the corresponding (receiving) entity has MIH capability. Here, the MIH_Capability_Discover.request message and the MIH_Capability_Discovery.response message can be further described as follows.

With respect to the MIH_Capability_Discover.request message, a MIH Message Identifier can be set as MIH_Capability_Discover.request message and then transmitted. This message can be transmitted via Layer 2 or Layer 3. If the transmitting entity does not know the exact address of the receiving entity, a broadcast message can be used to discover which entity of the network possesses the MIH function. Alternatively, even though the transmitting entity knows the address of the receiving entity, if the transmitting entity desires to know whether the receiving entity has the MIH function, the message is sent in unicast.

If the receiving entity of the MIH_Capability_Discovery.request message has the MIH function, then it can respond by transmitting the MIH_Capability_Discovery.response message. This message can be transmitted by including the parameters listed in Table 10 in the MIH message data. As is the case in the request message, this response message can be sent via Layer 2 or Layer 3. Here, the destination address included in the MIH header is assigned with a duplicated source address of the MIH_Capability_Discovery.request message, and the source address is assigned with its own address. Furthermore, the entity with the MIH function can advertise periodically its MIH capability via Layer 2 or Layer 3.

TABLE 10

| Name | Length | Value |
|---|---|---|
| SupportedEventList | 4 | For each Bit location, a value of ?? indicates the link event is supported. Bit #0: Link Up Bit #1: Link Down Bit #2: Link Going Down Bit #3: Link Detected Bit #4: Link Parameters Change Bit #5: Link Event Rollback Bit #6: Link SDU Transmit Success Bit #7: Link SDU Transmit Failure Bit #8~31: Reserved |
| SupportedCommandList | 4 | For each Bit location, a value of ?? indicates the link command is supported. Bit #0: Link Power Up Bit #1: Link Power Down Bit #2: Link Configure Bit #3: Link Connect Bit #4: Link Disconnect Bit #5: Link Sleep Bit #6: Link Scan Bit #7: Link Poll Bit #8~31: Reserved |

As discussed above, a signal message between MIHs can be classified by 'MIH Capability Discovery,' 'MIH Remote Event Registration,' 'MIH Remote Event Service,' and 'MIH Remote Command Service.' Up to this point, the discussion has been with respect to messages related to 'MIH Capability Discover.' Next, messages related to 'MIH Registration' will be discussed.

A MIH_Event_Registration_request message is used by the MIH function which desires to register an event service to be received in the remote stack. The details of which are shown in Table 11.

TABLE 11

| Name | Type (1 byte) | Length | Value |
|---|---|---|---|
| RequestedEventList | | 1 | Request for the corresponding service to be registered if each bit field is set to '1' Bit #0: Link Up Bit #1: Link Down Bit #2: Link Going Down Bit #3: Link Detected Bit #4: Link Parameters Change Bit #5: Link Event Rollback 6~7: Reserved |

A MIH_Event_Registration.confirm message is used to transmit the result of the MIH_Event_Registration_request message. The details of which are shown in Table 12.

TABLE 12

| Name | Type (1 byte) | Length | Value |
|---|---|---|---|
| ResponseEventList | | 1 | If each bit field is set to '1,' then the corresponding service is successfully registered. Bit #0: Link Up Bit #1: Link Down Bit #2: Link Going Down Bit #3: Link Detected Bit #4: Link Parameters Change Bit #5: Link Event Rollback Bit #6~7: Reserved |

A MIH_Event_Deregistration.request message is used to cancel registration of the event service registered in the remote stack. The details of which are shown in Table 13.

TABLE 13

| Name | Type (1 byte) | Length | Value |
|---|---|---|---|
| RequestedEventList | | 1 | Request for the corresponding service to be registered if each bit field is set to '1,'<br>0: Link Up<br>1: Link Down<br>2: Link Going Down<br>3: Link Detected<br>4: Link Parameters Change<br>5: Link Event Rollback<br>6~7: Reserved |

A MIH_Event_Deregistration.request message is used to transmit the result of the MIH_Event_Deregistration.request message. The details of which are shown in Table 14.

TABLE 14

| Name | Type (1 byte) | Length | Value |
|---|---|---|---|
| ResponseEventList | | 1 | For each Bit location, a value of ?? indicates the requested link event is de-registered correctly.<br>Bit #0: Link Up<br>Bit #1: Link Down<br>Bit #2: Link Going Down<br>Bit #3: Link Detected<br>Bit #4: Link Parameters Change<br>Bit #5: Link Event Rollback<br>6~7: Reserved |

Next, discussions related to 'MIH Event Service' will be presented. A MIH_Link_Up.indication message is used by the MS or the PoA to transmit Link_Up to the remote stack. This message indicates to the remote stack that a new link has been established. This message can be transmitted from the entities that have MIH capabilities to not only the MS or the PoA but also to all the entities that support the MIH function. The details of which are shown in Table 15.

TABLE 15

| Name | Type (1 byte) | Length | Value |
|---|---|---|---|
| MacMobileTerminal | | Variable | MAC Address |
| MacNewPoA | | Variable | MAC Address of New PoA (AP) |
| MacOldAccessRouter | | Variable | MAC Address of old Access Router (if any) |
| MacNewAccessRouter | | Variable | MAC Address of new Access Router |

A MIH_Link_Down.indication message is used by the MS or the PoA to transmit Link Up to the remote stack. This message indicates to the remote stack that a new link has been disconnected. This message can be transmitted from the entities that have MIH capabilities to not only the MS or the PoA but also to all the entities that support the MIH function. The details of which are shown in Table 16.

TABLE 16

| Name | Type (1 byte) | Length | Value |
|---|---|---|---|
| MacMobileTerminal | | Variable | MAC Address |
| MacNewPoA | | Variable | MAC Address of New PoA (AP) |
| MacOldAccessRouter | | Variable | MAC Address of old Access Router (if any) |
| ReasonCode | | 1 | Reason for why the link went down<br>0: RC_EXPLICIT_DISCONNECT (<br>1: RC_PACKET_TIMEOUT<br>2: RC_FAIL_NORESOURCE<br>3: 127: Reserved<br>128~255: RC_VENDOR_SPECIFIC |

'ReasonCode' from Table 16 includes various values. One of the values included is a value labeled RC_EXPLICIT_DISCONNECT which indicates that the link is down because of explicit disconnect procedures initiated by client or network. Another value is labeled RC_PACKET_TIMEOUT which indicates that the link is down because no acknowledgements were received for transmitted packets within the specified time limit. RC_FAIL_NORESOURCE value indicates that the link is down because there were no resources to maintain the connection. Lastly, a value labeled RC_VENDOR_SPECIFIC indicates a vendor specific reason code.

Next, discussions related to 'MIH Command Service' will be presented. First, there is a 'MIH_Network_Address_Information.request' message which is transmitted to a currently connected access point or the BS to request for new IP address information of a new PoA before the MS attempts to perform handover with another interface network. After receiving the message, if the new PoA has the address information of the foreign agent (FA) or the access router, the new PoA sends the address information to the current PoA of the MS. However, if the new PoA does not have the address information, the new PoA sends the address information to a new FA or a new access router. The details of which are shown in Table 17.

TABLE 17

| Name | Type (1 byte) | Length | Value |
|---|---|---|---|
| MacMobileTerminal | | Variable | MAC Address of Mobile Terminal |
| MacAccessRouter | | Variable | MAC Address of Access Router |
| MACNewPoA | | Variable | MAC Address of New PoA |
| Home Address | | 4 or 6 | Home IP address of Mobile Terminal |
| CoA | | 4 or 6 | Care of Address of Mobile Terminal |
| Old FA Address/Old Access Router Address | | 4 or 6 | In case of Mobile IPv4, this parameter represents IP address of old Foreign Agent, and in case of Mobile IPv6, this parameter represents IP address of old Access Router. |

Second, there is a 'MIH_Network_Address_Information.response' message. This message is transmitted by the new FA or access router to provide corresponding IP address information in response to the 'MIH_Network_Address_Information.request' message. The details of which are shown in Table 18.

TABLE 18

| Name | Type (1 byte) | Length | Value |
|---|---|---|---|
| MacMobileTerminal | | Variable | MAC Address of Mobile Terminal |
| MacAccessRouter | | Variable | MAC Address of Access Router |
| MACNewPoA | | Variable | MAC Address of New PoA |
| Home Address | | 4 or 6 | Home IP address of Mobile Terminal |
| FA Address/Access Router Address | | 4 or 6 | In case of Mobile IPv4, this parameter represents IP address of Foreign Agent, and in case of Mobile IPv6, this parameter represents IP address of Access Router. |
| Network Address Information | | Variable | In case of Mobile IPv4, Agent Advertisement is encapsulated and in case of Mobile IPv6, Router Advertisement is encapsulated. |

Figure 15:
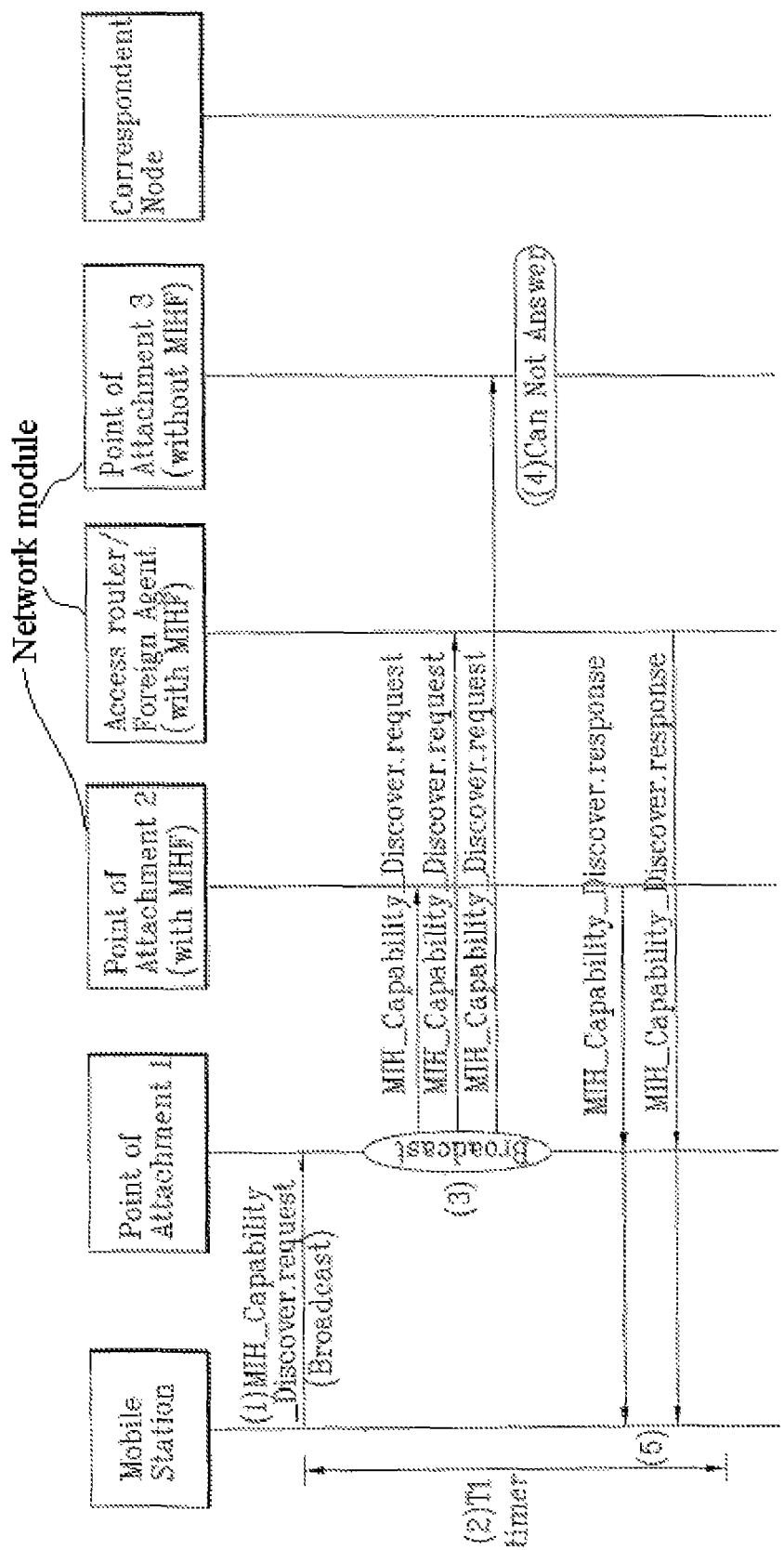
FIG. 15 illustrates a flow of an embodiment of the present invention.

FIG. 15 illustrates a flow of an embodiment of the present invention. More specifically, the MS broadcasts the 'MIH_Capability_Discover.request/response' messages to discover which entity in the network supports the MIH function and/or the MIH capability. The terms 'entity' and 'module' can be interchangeably used throughout the present application. In addition, the terms 'MIH function' and a 'network handover module' can be used interchangeably.

The MIH function (the network handover module) refers to whether the entity has the function to facilitate handover between heterogeneous networks and/or between homogeneous networks. As for an entity which has MIH capability, this means that the entity indicates which service list is supported by the MIH of the entity. The service list includes a command service (CS), an event service (ES), and an information list (IS). It is possible for the entity to have more than one service list.

First, a network handover module is established for converging information from at least one network interface module (e.g., a wired-line broadband interface, a wireless broadband interface, and a cellular interface) associated with at least one of a homogeneous and a heterogeneous network handover module into a unified presentation. Thereafter, the MS broadcasts via Layer 2 a 'MIH_Capability_Discover.request' message to determine which entity in the network supports the MIH function. In addition, the message can also be broadcasted via Layer 3. If the message is sent via Layer 2, information in the 'Destination Hardware Address' field of FIG. 13 packet format can be broadcasted while information in the 'Destination Address' field can be broadcasted as well. Here, a new 'Ethertype' field, which has the capability to identify MIH capability, can be included in the Layer 2 message header to identify the MIH message. Alternatively, if the message is sent via Layer 3, the 'Destination IP Address' field of FIG. 13 packet format can be transmitted. Here, in order for Layer 3 (e.g., IP layer) to identify this message as the MIH message, a 'protocol type' field can be defined and included as a new MIH type.

Alternatively, the MS can transmit (unicast) via Layer 3 a 'MIH_Capability_Discover.request' message to determine whether a specific (or a target) entity supports the MIH function and/or MIH capability. Here, homogeneous and/or heterogeneous networks are applicable. In addition, the MS can transmit 'MIH_Capability_Discover.request' message via Layer 2. Here, the request message is transmitted to a PoA first. Thereafter, the request message is then transmitted or relayed to a specific entity to determine whether the specific entity supports the MIH function and/or MIH capability.

Second, the MS can initiate a timer (T1) when transmitting the 'MIH_Capability_Discover.request' message. In case where the message is transmitted to a specific target (entity), if the 'MIH_Capability_Discover.response' message is not received during the time set in the timer, the MS determines that there is no receiving entity. In case where the message is broadcasted, if the 'MIH_Capability_Discover.response' message is not received during the time set in the timer, the MS determines that there is no entity that supports the MIH function. The PoA broadcasts via a Layer 2 link of the PoA.

If the request message is broadcasted via Layer 3, the PoA receives this message and sends the message to a broadcast area of Layer 3 (e.g., a specified subnet, entire area), which in turn transmits via Layer 3. In FIG. 15, PoA3 does not have the MIH function (MIHF) and therefore, cannot receive the MIH message. Furthermore, PoA3 cannot receive the 'MIH_Capability_Discover.request' message and thus cannot respond to this message, as illustrated in step 4.

However, PoA2 and the FA/access router, which supports the MIH function, can receive the request message and send the 'MIH_Capability_Discover.response' message in response to the request message, as shown in step 5. Thereafter, the MS receives the address information included in the response message and determines which entity has the MIH capability. Subsequently, the MS can send the address to the UPE or can keep this address for use in future handovers.

Figure 16:
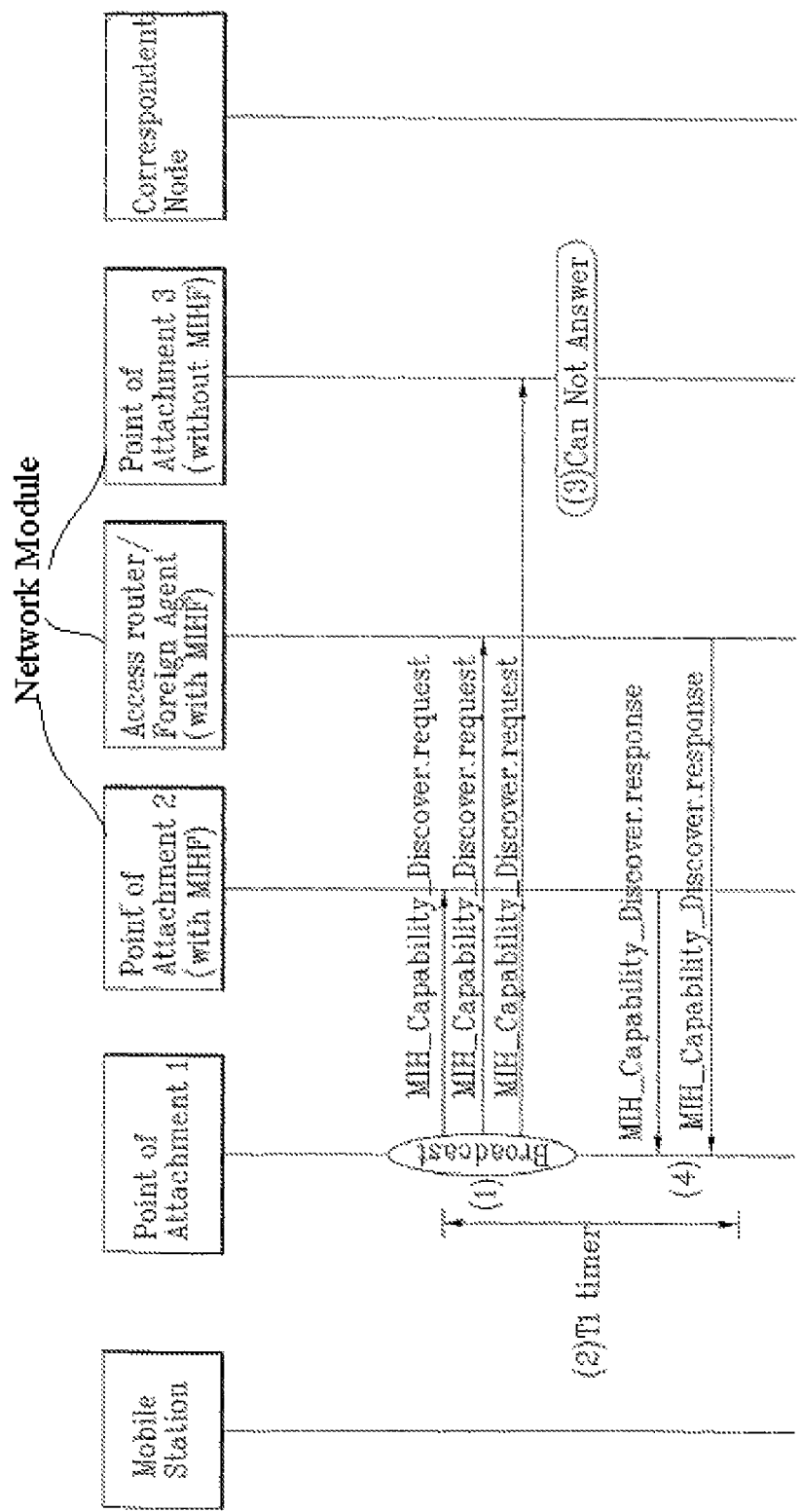
FIG. 16 illustrates a flow of another embodiment of the present invention.

FIG. 16 illustrates a flow of another embodiment of the present invention. More specifically, FIG. 16 shows discovery of an entity that supports MIH function from a plurality of entities or modules in the network initiated by PoA1. The difference from FIG. 15 is that here, the message is broadcasted (initiated) by PoA1 (e.g., BS, access point, network entity) instead of the MS. Beside this difference, the steps are same to those of FIG. 15.

Figure 17:
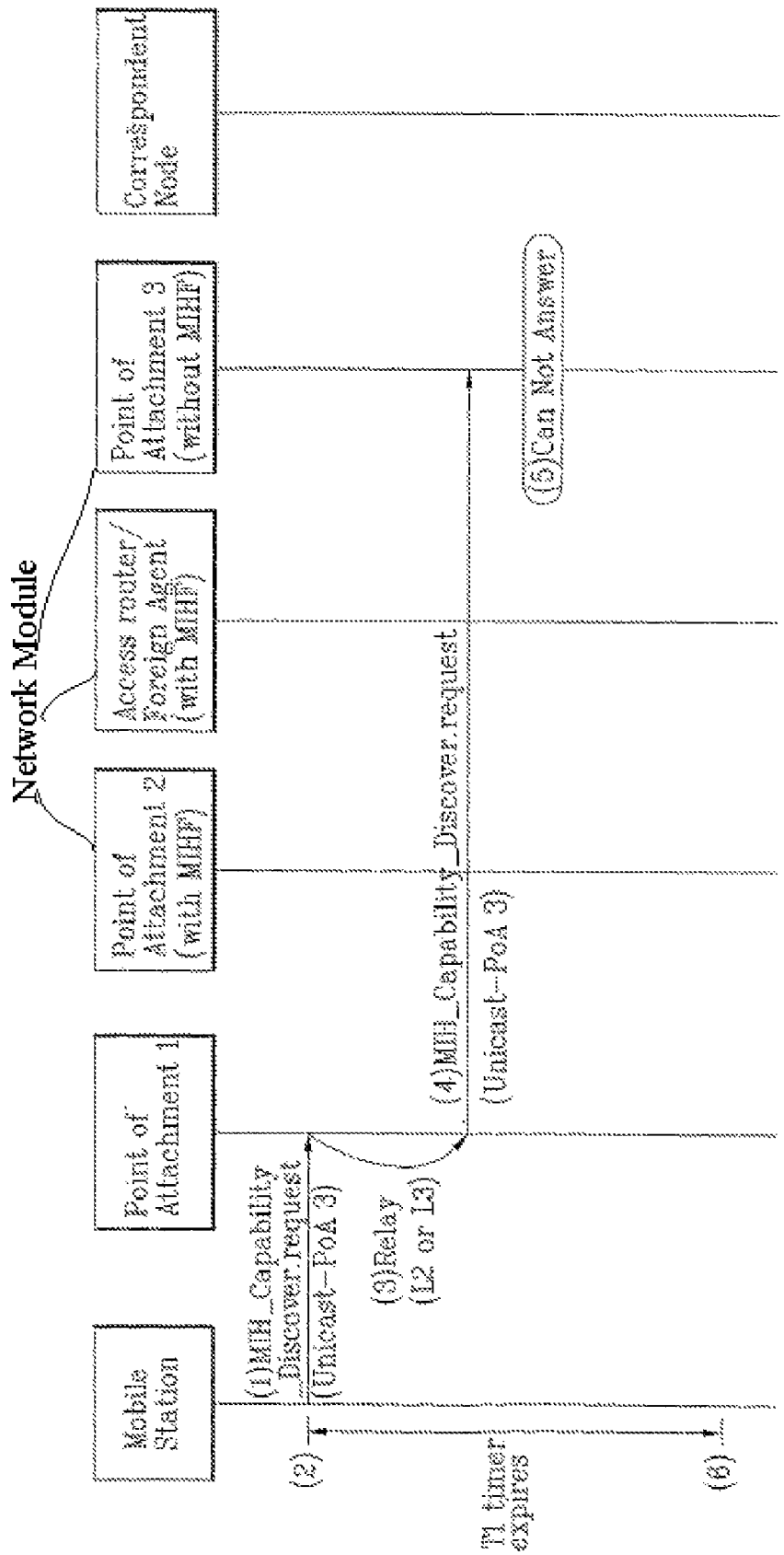
FIG. 17 illustrates a flow of yet another embodiment of the present invention.

FIG. 17 illustrates a flow of yet another embodiment of the present invention. More specifically, FIG. 17 illustrates a failed scenario in discovering the entity having MIH function capabilities.

First, the MS transmits a 'MIH_Capability_Discover.request' message to PoA1 to determine whether PoA3, whose address information is known by the MS, supports the MIH function. Upon transmission, the timer is initiated. PoA1 looks at the destination address of the message, determines that the message is targeted for PoA3, and transmits (forwards) the message to PoA3. The message is then received by PoA3. Here, the MIH packet format is used in transmission of the MIH message.

In this example, the PoA3 does not support MIHF and thus PoA3 cannot receive the message and cannot respond to the message. Since the MS has not received the response message prior to the expiration of the timer, which was initiated at the transmission of the 'MIH_Capability_Discover.request' message, the MS learns that PoA3 does not support the MIH function based on the expired timer.

Figure 18:
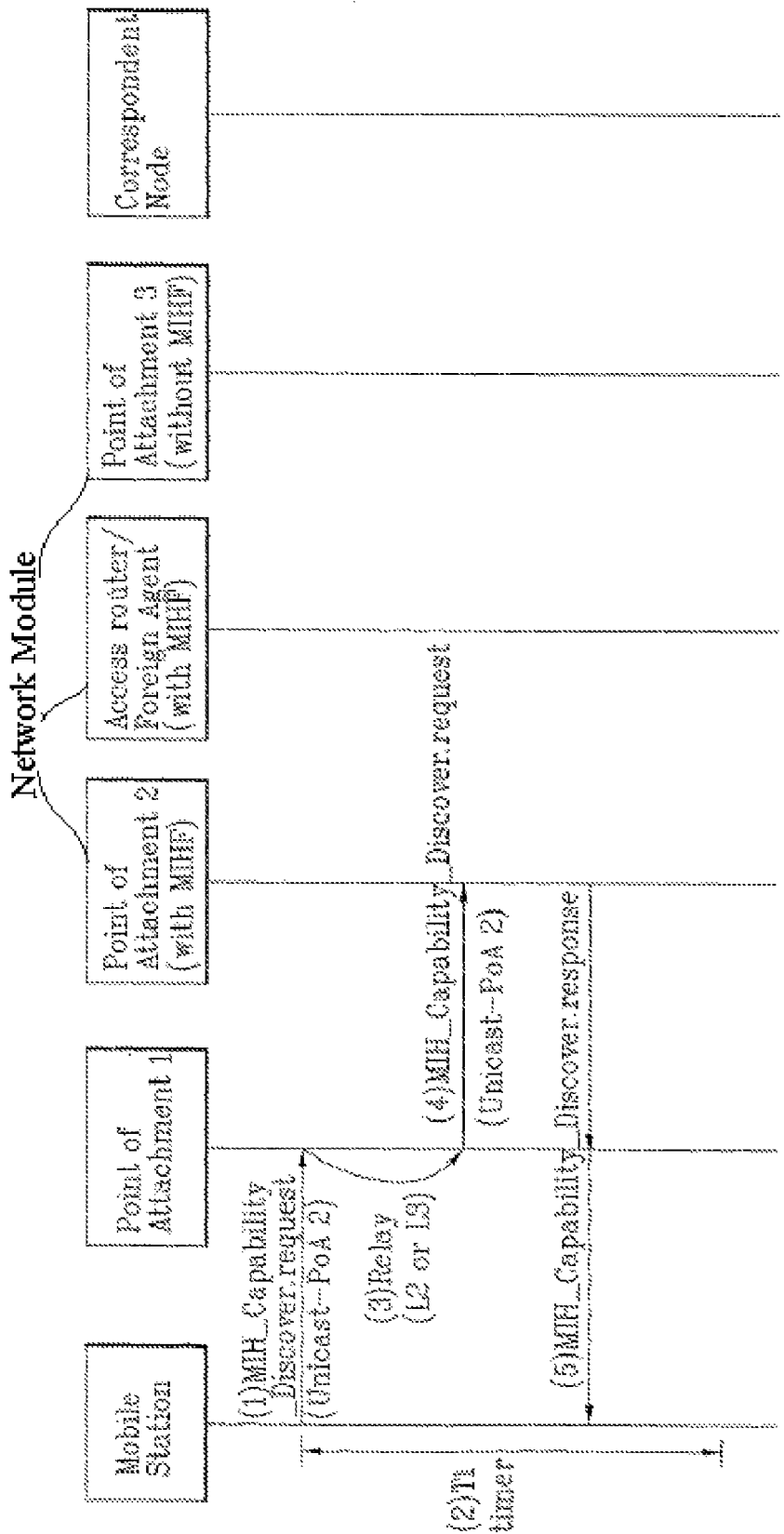
FIG. 18 illustrates a flow of a further embodiment of the present invention.

FIG. 18 illustrates a flow of a further embodiment of the present invention. Contrary to FIG. 17, FIG. 18 illustrates an example where the entity having the MIH function capabilities is successfully discovered. The steps up to PoA3 receiving the message is same as in FIG. 17. However, since PoA2 supports the MIHF, PoA2 can receive the 'MIH_Capability_Discover.request' message transmitted from the MS. In response, PoA2 can then send the 'MIH_Capability_Discover.response' message. Here, since the MS receives the response message prior to the expiration of the timer, the MS can discover that PoA2 supports the MIH function.

Figure 19:
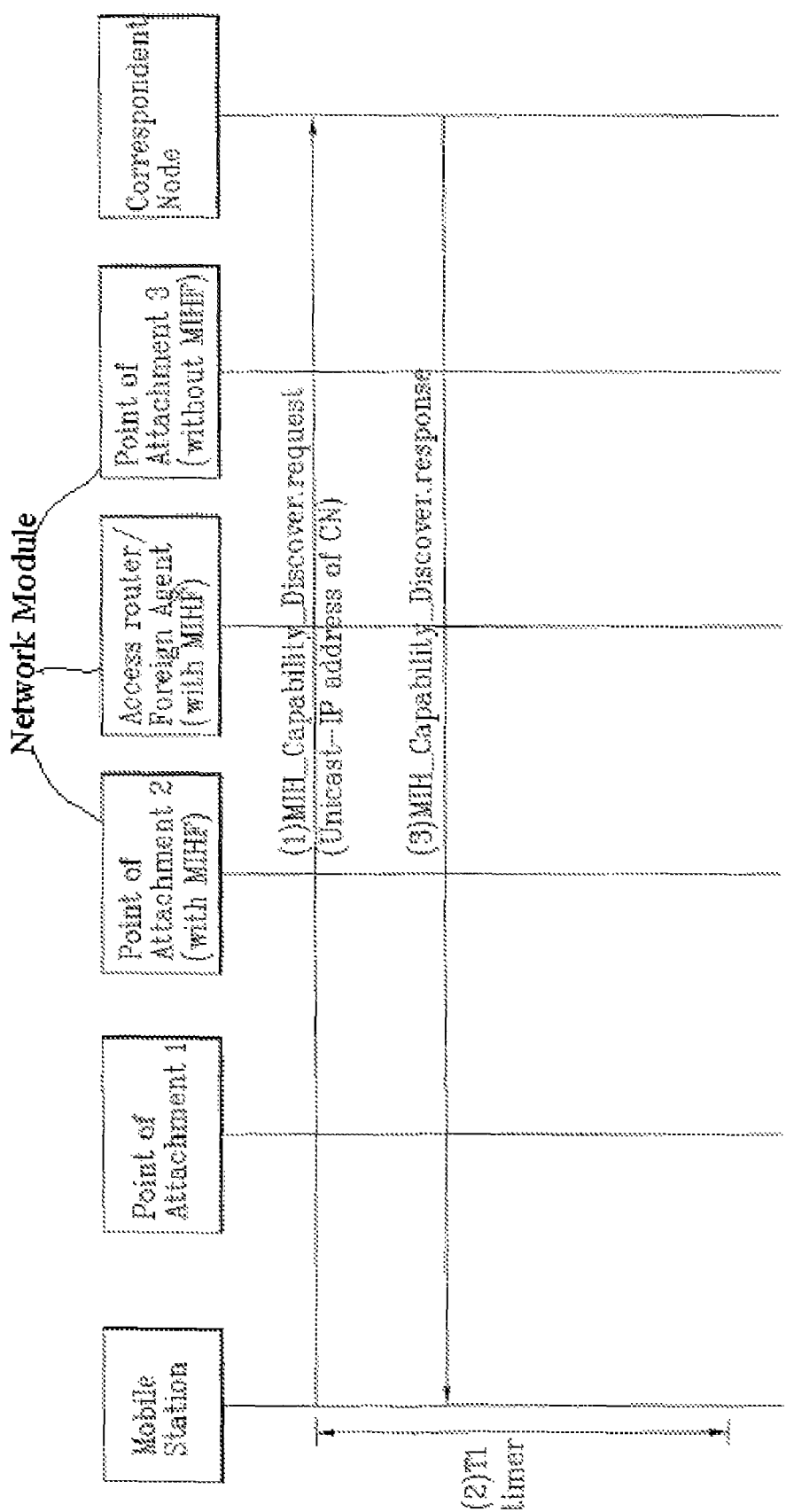
FIG. 19 illustrates a flow of another embodiment of the present invention.

FIG. 19 illustrates a flow of another embodiment of the present invention. More specifically, the MS determines via Layer 3 whether the corresponding node (entity/module) supports the MIH function.

The MS transmits a 'MIH_Capability_Discover.request' message using the IP address discovered during link establishment with the corresponding node. At this time (time of transmission), a timer is initiated. Upon receiving the request message, since the corresponding node supports the MIH function, the corresponding node can receive the message and respond by transmitting a 'MIH_Capability_Discover.response' message to the MS. Since the response message is received by the MS prior to the expiration of the timer, the MS can discover that the corresponding node supports the MIH function.

Figure 20:
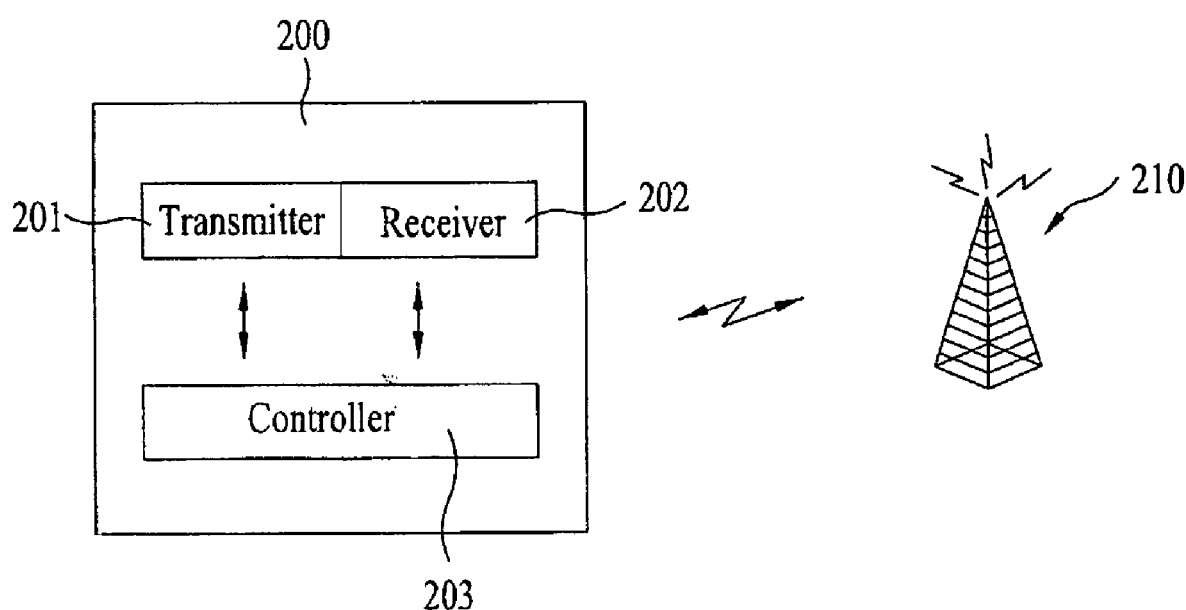
FIG. 20 illustrates an exemplary diagram of an apparatus for discovering an entity to perform handover with in a wireless mobile communication system.

FIG. 20 illustrates an exemplary diagram of an apparatus for discovering an entity to perform handover with in a wireless mobile communication system. More specifically, an apparatus 200 (e.g., MS) comprises a transmitter 201, a receiver 202, and a controller 203. The controller can be used to establish a network handover module for converging information from at least one network interface module associated with at least one of a homogeneous and a heterogeneous network handover module into a unified presentation. The transmitter can be used to transmit messages such as a broadcast request message to a PoA 210 (e.g., BS, access point, network entity) which can then transmit the broadcast request message to at least one entity to identify at least one entity whether supports at least one of MIH function and MIH capability. The receiver 202 can be used to receive at least one response message from the at least one entity via the PoA 210 (e.g. BS, access point, network entity) prior to expiration of a timer. Here, the response message indicates that the at least one entity supports at least one of MIH function and MIH capability. Lastly, the controller 203 can also be use to initiate a timer for a specified time period when the broadcast request message is transmitted.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of registering with at least one network module for a media independent handover (MIH) at a mobile station (MS) within a wireless mobile communication network, the method comprising:
    determining whether the MS has identified an identifier of a media independent handover function (MIHF) of a destination network module;
    transmitting a MIH capability discovery request message comprising a MIHF source identifier field and a MIHF destination identifier field from a MIHF of the MS to at least one network module,
    wherein the MIH capability discovery request message is transmitted to a plurality of network modules within a predetermined domain and the transmission of the MIH capability discovery request message is for discovering which of the plurality of network modules within the predetermined domain supports the MIHF and for discovering at least one service supported by the MIHF supporting network module when the MS has not identified the identifier, and
    wherein the MIH capability discovery request message is transmitted to a specific network module with a MIHF identifier which is known to the MS and the transmission of the MIH capability discovery request message is for discovering at least one service supported by the specific network module when the MS has identified the identifier;
    receiving, at the MIHF of the MS, at least one MIH capability discovery response message in response to the MIH capability discovery request message only from the MIHF supporting network module among the plurality of network modules receiving the MIH capability discovery request message, or from the specific network module,
    wherein the at least one MIH capability discovery response message comprises a MIHF source identifier field having an identifier of the MIHF of the MIHF supporting network module or the identifier of the MIHF of the specific network module, and at least one service list field indicating a service list for among a command service, an event service and an information service supported by the MIHF supporting network module or the specific network module; and
    registering with the MIHF supporting network module or the specific network module for the service list supported by the MIHF supporting network module or the specific network module.

2. The method of claim 1, wherein the MIH capability discovery request message and the MIH capability response message further comprise:
    a MIH service ID field indicating services corresponding to the MIH capability discovery request message or the MIH capability response message,
    a MIH Opcode field indicating an operation among a request, a response, and an indication, and
    a MIH message ID field indicating if a performed operation is a MIH capability discovery.

3. The method of claim 2, wherein the MIHF destination identifier field of the MIH capability discovery request message is set as a first identifier for the plurality of network modules when the MS does not know the identifier, and
    wherein the MIHF destination identifier field of the MIH capability discovery request message is set as a second identifier for the MIHF of the specific network module when the MS knows the identifier.

4. A mobile station apparatus for registering with at least one network module for a media independent handover (MIH) within a wireless mobile communication network, the mobile station apparatus comprising:
    a media independent handover function (MIHF) module configured to provide a MIH service using a MIH message;
    a transmitter configured to transmit a MIH capability discovery request message comprising a MIHF source identifier field and a MIHF destination identifier field to at least one network module; and
    a receiver configured to receive at least one MIH capability discovery response message in response to the MIH capability discovery request message,
    wherein the at least one network module is a plurality of network modules within a predetermined domain and the transmission of the MIH capability discovery request message is for discovering which of the plurality of network modules within the predetermined domain supports the MIHF and for discovering at least one service supported by the MIHF supporting network module when the apparatus has not identified an identifier of a MIHF of a destination network module of the MIH capability discovery request message, wherein the at least one network module is a specific network module comprising an MIHF identifier which is known to the apparatus and the transmission of the MIH capability discovery request message is for discovering at least one service supported by the specific network module when the apparatus has identified the MIHF identifier of the specific network module, wherein the receiver receives the at least one MIH capability discovery response message only from the MIHF supporting network module among the plurality of network modules receiving the MIH capability discovery request message, or from the specific network module, and wherein the at least one MIH capability discovery response message is a MIHF source identifier field having an identifier of the MIHF of the MIHF supporting network module or the MIHF of the specific network module, and at least one service list field indicating a service list among a command service list, an event service list and an information service list supported by the MIHF supporting network module or the specific network module.

5. The apparatus of claim 4, wherein the MIH capability discovery request message and the MIH capability response message further comprises:
- a MIH service ID field indicating services corresponding to the MIH capability discovery request message or the MIH capability response message,
- a MIH Opcode field indicating an operation among a request, a response and an indication, and
- a MIH message ID field indicating if a performed operation is a MIH capability discovery.

6. The apparatus of claim 4, wherein the MIHF destination identifier field of the MIH capability discovery request message is set as a first identifier for the plurality of network modules when the MS does not know the identifier, and wherein the MIHF destination identifier field of the MIH capability discovery request message is set as a second identifier for the MIHF of the specific network module when the MS knows the identifier.

* * * * *